US011526664B2

United States Patent
Li et al.

(10) Patent No.: US 11,526,664 B2
(45) Date of Patent: Dec. 13, 2022

(54) METHOD AND APPARATUS FOR GENERATING DIGEST FOR MESSAGE, AND STORAGE MEDIUM THEREOF

(71) Applicant: TENCENT TECHNOLOGY (SHENZHEN) COMPANY LIMITED, Shenzhen (CN)

(72) Inventors: Jing Li, Shenzhen (CN); Yan Song, Shenzhen (CN); Shuming Shi, Shenzhen (CN)

(73) Assignee: TENCENT TECHNOLOGY (SHENZHEN) COMPANY LIMITED, Guangdong (CN)

(\*) Notice: Subject to any disclaimer, the term of this patent is extended or adjusted under 35 U.S.C. 154(b) by 280 days.

(21) Appl. No.: 17/012,620

(22) Filed: Sep. 4, 2020

(65) Prior Publication Data
US 2021/0142004 A1 May 13, 2021

Related U.S. Application Data

(63) Continuation of application No. PCT/CN2019/085546, filed on May 5, 2019.

(30) Foreign Application Priority Data

May 31, 2018 (CN) .......................... 201810552736.8

(51) Int. Cl.
G06F 17/00 (2019.01)
G06F 40/211 (2020.01)
H04L 51/52 (2022.01)

(52) U.S. Cl.
CPC .......... *G06F 40/211* (2020.01); *H04L 51/52* (2022.05)

(58) Field of Classification Search
CPC .............................. G06F 40/211; H04L 51/52
(Continued)

(56) References Cited

U.S. PATENT DOCUMENTS 6,311,198 B1 * 10/2001 Uramoto ............. G06F 16/3347
707/999.005
6,346,952 B1 * 2/2002 Shtivelman ............. G06F 40/35
707/999.005
(Continued)

FOREIGN PATENT DOCUMENTS

CN 107357785 11/2017

OTHER PUBLICATIONS

Arora, Sanjeev et al. "Learning Topic Models—Going beyond SVD." 2012 IEEE 53rd Annual Symposium on Foundations of Computer Science (2012): 1-10.*
(Continued)

*Primary Examiner* — Cesar B Paula
*Assistant Examiner* — James H. Blackwell
(74) *Attorney, Agent, or Firm* — Crowell & Moring, L.L.P.

(57) ABSTRACT

Embodiments of this application provide a message digest generation method and apparatus, and a storage medium. The generation method is performed by an electronic device, and includes: obtaining a plurality of associated messages from a to-be-processed message set; generating a function label distribution model, a sentiment label distribution model, a word category label distribution model, and a word sentiment polarity label distribution model corresponding to each of the plurality of associated messages; determining, based on the function label distribution model, the sentiment label distribution model, the word category label distribution model, and the word sentiment polarity label distribution model, a distribution probability that a category of a word
(Continued)

included in the plurality of associated messages is a subject content word; and generating a digest of the plurality of associated messages according to the distribution probability of the subject content word.

20 Claims, 7 Drawing Sheets

(58) Field of Classification Search
USPC .............................................. 704/9
See application file for complete search history.

(56) References Cited

U.S. PATENT DOCUMENTS

| | | | | |
|---|---|---|---|---|
| 6,847,924 | B1* | 1/2005 | Aldridge | G06F 17/18 703/2 |
| 8,161,381 | B2* | 4/2012 | Newman | H04L 69/329 715/255 |
| 8,402,369 | B2* | 3/2013 | Zhu | G06F 16/345 715/254 |
| 8,868,670 | B2* | 10/2014 | Bagga | G06Q 10/107 709/206 |
| 9,092,514 | B2* | 7/2015 | Cardie | G06F 16/93 |
| 10,319,368 | B2* | 6/2019 | Ushio | G10L 15/1815 |
| 10,467,630 | B2* | 11/2019 | Iyer | G06F 16/33 |
| 10,762,116 | B2* | 9/2020 | Zhao | G06F 16/335 |
| 10,785,185 | B2* | 9/2020 | Vennam | G06Q 10/109 |
| 11,086,916 | B2* | 8/2021 | Zhao | G06F 16/3334 |
| 2005/0262214 | A1* | 11/2005 | Bagga | G06F 16/345 709/207 |
| 2008/0281927 | A1* | 11/2008 | Vanderwende | G06F 40/258 709/206 |
| 2008/0301250 | A1* | 12/2008 | Hardy | G06Q 10/107 709/207 |
| 2009/0300486 | A1* | 12/2009 | Zhu | G06F 16/345 704/9 |
| 2010/0262924 | A1* | 10/2010 | Kalu | H04L 51/04 709/204 |
| 2013/0024183 | A1* | 1/2013 | Cardie | G06F 16/345 704/8 |
| 2015/0286710 | A1 | 10/2015 | Chang et al. | |
| 2016/0180722 | A1 | 6/2016 | Yehezkel et al. | |
| 2016/0196561 | A1* | 7/2016 | Iyer | G06Q 50/01 705/304 |
| 2017/0365252 | A1* | 12/2017 | Ushio | G06F 40/30 |
| 2019/0197107 | A1* | 6/2019 | Lin | G06N 3/0445 |
| 2019/0205462 | A1* | 7/2019 | Zhao | G06F 16/34 |
| 2019/0205464 | A1* | 7/2019 | Zhao | G06Q 10/107 |
| 2019/0362717 | A1* | 11/2019 | Meng | G10L 15/14 |
| 2019/0386949 | A1* | 12/2019 | Vennam | G06F 40/279 |
| 2020/0265192 | A1* | 8/2020 | Lin | G06F 40/30 |
| 2021/0142004 | A1* | 5/2021 | Li | H04L 51/52 |
| 2021/0334467 | A1* | 10/2021 | Wan | G06N 3/0454 |

OTHER PUBLICATIONS

Carenini, Giuseppe & Ng, Raymond & Zhou, Xiaodong. (2007). Summarizing email conversations with clue words. 91-100. 10.1145/1242572.1242586.*

B. Lu, M. Ott, C. Cardie and B. K. Tsou, "Multi-aspect Sentiment Analysis with Topic Models," 2011 IEEE 11th International Conference on Data Mining Workshops, 2011, pp. 81-88, doi: 10.1109/ICDMW.2011.125.*

Selvaraju, Sendhilkumar & Nandhini, Nachiyar & G S, Mahalakshmi. (2013). Novelty Detection via Topic Modeling in Research Articles. Computer Science & Information Technology. 3. 401-410. 10.5121/csit.2013.3542.*

Qiaozhu Mei, Xuehua Shen, and ChengXiang Zhai. 2007. Automatic labeling of multinomial topic models. In Proceedings of the 13th ACM SIGKDD international conference on Knowledge discovery and data mining (KDD '07). Association for Computing Machinery, New York, NY, USA, 490-499. https://doi.org/10.1145/1281192.1281.*

David M. Biei. 2012. Probabilistic topic models. Commun. ACM 55, 4 (Apr. 2012), 77-84. https://doi.org/10.1145/2133806.2133826.*

David Newman, Chaitanya Chemudugunta, and Padhraic Smyth. 2006. Statistical entity-topic models. In Proceedings of the 12th ACM SIGKDD international conference on Knowledge discovery and data mining (KDD '06). Association for Computing Machinery, New York, NY, USA, 680-686. https://doi.org/10.1145/1150402.1150487.*

Jean-Yves Delort and Enrique Alfonseca. 2012. DualSum: a Topic-Model based approach for update summarization. In Proceedings of the 13th Conference of the European Chapter of the Association for Computational Linguistics, pp. 214-223, Avignon, France. Association for Computational Linguistics.*

Griffiths, Thomas & Steyvers, Mark. (2004). Finding Scientific Topics. Proceedings of the National Academy of Sciences of the United States of America. 101 Suppl 1. 5228-35. 10.1073/pnas.0307752101.*

Subeno, Bambang & Kusumaningrum, Retno & Farikhin, Farikhin. (2018). Optimisation towards Latent Dirichlet Allocation: Its Topic Number and Collapsed Gibbs Sampling Inference Process. International Journal of Electrical and Computer Engineering (IJECE). 8 . 3204. 10.11591/ijece.v8i5. pp. 3204-3213.*

Rachit Arora and Balaraman Ravindran. 2008. Latent dirichlet allocation based multi-document summarization. In Proceedings of the second workshop on Analytics for noisy unstructured text data (AND '08). Association for Computing Machinery, New York, NY, USA, 91-97. https://doi.org/10.1145/1390749.1390764.*

Y. Zhong et al., "An Improved LDA Multi-document Summarization Model Based on TensorFlow," 2017 IEEE 29th International Conference on Tools with Artificial Intelligence (ICTAI), 2017, pp. 255-259, doi: 10.1109/ICTAI.2017.00048.*

Venkatesh, Ravi. (2013). Legal Documents Clustering and Summarization using Hierarchical Latent Dirichlet Allocation. IAES International Journal of Artificial Intelligence (IJ-AI). 2. 10.11591/ij-ai.v2i1.1186.*

Fabbri, A.R., Rahman, F., Rizvi, I., Wang, B., Li, H., Mehdad, Y., & Radev, D. (2021). ConvoSumm: Conversation Summarization Benchmark and Improved Abstractive Summarization with Argument Mining. ACL.*

Ulrich, Jan. "Supervised machine learning foremail thread summarization." (2008).*

David M. Zajic, Bonnie J. Dorr, Jimmy Lin, Single-document and multi-document summarization techniques foremail threads using sentence compression, Information Processing & Management, vol. 44, Issue 4.*

EmailSum: Abstractive Email Thread Summarization](https://aclanthology.org/2021.acl-long.537) (Zhang et al., ACL 2021).*

[Extractive Summarization and Dialogue Act Modeling on Email Threads: An Integrated Probabilistic Approach](https://aclanthology.org/W14-4318) (Oya & Carenini, 2014).*

Rambow, Owen & Shrestha, Lokesh & Chen, John & Lauridsen, Chirsty. (2004). Summarizing Email Threads. 10.3115/1613984.1614011.*

Blei, D.M. et al., "Latent Dirichlet Allocation," Journal of Machine Learning Research 3 (2003) 993-1022.*

J. Krishnamani, Y. Zhao and R. Sunderraman, "Forum Summarization Using Topic Models and Content-Metadata Sensitive Clustering," 2013 IEEE/WIC/ACM International Joint Conferences on Web Intelligence (WI) and Intelligent Agent Technologies (IAT), 2013, pp. 195-198, doi: 10.1109/WI-IAT.2013.182.*

Aria Haghighi and Lucy Vanderwende. 2009. Exploring content models for multi-document summarization. In Proceedings of Human Language Technologies: The 2009 Annual Conference of the North American Chapter of the Association for Computational Linguistics (NAACL '09). Association for Computational Linguistics, USA.*

Zhaochun Ren, Jun Ma, Shuaiqiang Wang, and Yang Liu. 2011. Summarizing web forum threads based on a latent topic propagation process. In Proceedings of the 20th ACM international conference

(56) References Cited

OTHER PUBLICATIONS on Information and knowledge management (CIKM '11). Association for Computing Machinery, New York, NY, USA, 879-884. https://.*

Wang, Yue & Li, Jing & King, Irwin & Lyu, Michael & Shi, Shuming. (2019). Microblog Hashtag Generation via Encoding Conversation Contexts. 10.18653/v1/N19-1164.*

Zeng, J. et al., "What You Say and How You Say It: Joint Modeling of Topics and Discourse in Microblog Conversation," ACL, 2019, pp. 267-281.*

Jing Li, Yan Song, Zhongyu Wei, and Kam-Fai Wong. 2018. A joint model of conversational discourse and latent topics on microblogs. Comput. Linguist. 44, 4 (Dec. 2018), 719-754. https://doi.org/10.1162/coli_a_00335.*

Tarnpradab, S., Jafariakinabad, F., & Hua, K.A. (2021). Improving Online Forums Summarization via Unifying Hierarchical Attention Networks with Convolutional Neural Networks. ArXiv, abs/2103.13587.*

Journal of Chinese Information Processing, vol. 30, No. 4, Jul. 2016.

International Search Report issued in International Application No. PCT/CN2019/085546 dated Jun. 27, 2019.

* cited by examiner

METHOD AND APPARATUS FOR GENERATING DIGEST FOR MESSAGE, AND STORAGE MEDIUM THEREOF

RELATED APPLICATION

This application is a continuation application of PCT Patent Application No. PCT/CN2019/085546, filed on May 5, 2019, which claims priority to Chinese Patent Application No. 201810552736.8, entitled "MESSAGE DIGEST GENERATION METHOD AND APPARATUS" and filed with the National Intellectual Property Administration, PRC on May 31, 2018, wherein the entirety of each of the above-referenced applications is incorporated herein by reference in its entirety.

FIELD OF THE TECHNOLOGY

This application relates to the field of computer technologies, and specifically, to a message digest generation method and apparatus, an electronic device, and a storage medium.

BACKGROUND OF THE DISCLOSURE

Currently, when digests of messages in social media are extracted, each message is usually used as an article (for example, each status in WeChat Moments is regarded as an article), and then a digest of the message is extracted using a content-based multi-article summarization method. However, due to characteristics such as short text, loud noise, and informal language of the messages in the social media, ideal effects cannot be achieved by directly using the content-based multi-article summarization method.

The information disclosed in the background is merely used to enhance understanding of the background of this application, and therefore may include information of the related art not known by a person of ordinary skill in the art.

SUMMARY

Embodiments of this application provide a message digest generation method and apparatus, an electronic device, and a storage medium, to overcome, at least to some extent, the problem in the related art that a message digest cannot be accurately obtained.

Other features and advantages of this application become obvious through the following detailed descriptions or partially learned through practice in this application.

According to an aspect of the embodiments of this application, a message digest generation method is provided, including: obtaining a plurality of associated messages from a to-be-processed message set; generating a function label distribution model, a sentiment label distribution model, a word category label distribution model, and a word sentiment polarity label distribution model corresponding to each of the plurality of associated messages, the word category label distribution model representing a probability that messages having different function labels include words with respective categories, and the word sentiment polarity label distribution model representing a probability that messages having different sentiment labels include words with respective sentiment polarities, determining, based on the function label distribution model, the sentiment label distribution model, the word category label distribution model, and the word sentiment polarity label distribution model, a distribution probability that a category of a word included in the plurality of associated messages is a subject content word; and generating a digest of the plurality of associated messages according to the distribution probability of the subject content word.

According to an aspect of the embodiments of this application, a message digest generation apparatus is provided, including: a memory operable to store program code; and a processor operable to read the program code. The processor is configured to: obtain a plurality of associated messages from a to-be-processed message set; generate a function label distribution model, a sentiment label distribution model, a word category label distribution model, and a word sentiment polarity label distribution model corresponding to each of the plurality of associated messages, the word category label distribution model representing a probability that messages having different function labels include words with respective categories, and the word sentiment polarity label distribution model representing a probability that messages having different sentiment labels include words with respective sentiment polarities; determine, based on the function label distribution model, the sentiment label distribution model, the word category label distribution model, and the word sentiment polarity label distribution model, a distribution probability that a category of a word included in the plurality of associated messages is a subject content word; and generate a digest of the plurality of associated messages according to the distribution probability of the subject content word.

According to an aspect of the embodiments of this application, an electronic device is provided, including one or more processors and a storage apparatus, the storage apparatus being configured to store one or more executable program instructions; and the one or more processors being configured to execute the one or more executable program instructions in the storage apparatus, to implement the message digest generation method according to the foregoing embodiment.

According to an aspect of the embodiments of this application, a non-transitory machine-readable media is provided, storing a processor-executable instructions for causing a processor to: obtain a plurality of associated messages from a to-be-processed message set; generate a function label distribution model, a sentiment label distribution model, a word category label distribution model, and a word sentiment polarity label distribution model corresponding to each of the plurality of associated messages, the word category label distribution model representing a probability that messages having different function labels comprise words with respective categories, and the word sentiment polarity label distribution model representing a probability that messages having different sentiment labels comprise words with respective sentiment polarities; determine, based on the function label distribution model, the sentiment label distribution model, the word category label distribution model, and the word sentiment polarity label distribution model, a distribution probability that a category of a word in the plurality of associated messages is a subject content word; and generate a digest of the plurality of associated messages according to the distribution probability of the subject content word.

It is to be understood that the above general descriptions and the following detailed descriptions are merely for exemplary and explanatory purposes, and cannot limit this application.

BRIEF DESCRIPTION OF THE DRAWINGS

The accompanying drawings, which are incorporated herein and constitute a part of this specification, illustrate embodiments consistent with this application and, together with this specification, serve to explain the principles of this application. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

Exemplary implementations are described more comprehensively with reference to the accompanying drawings. However, the exemplary implementations may be implemented in various forms, and is not to be understood as being limited to the examples described herein. Conversely, the implementations are provided to make this application more comprehensive and complete, and comprehensively convey the concept of the exemplary implementations to a person skilled in the art.

In addition, the described features, structures, or properties may be combined in one or more embodiments in any proper manner. In the following descriptions, many specific details are provided to give a comprehensive understanding of the embodiments of this application. However, a person skilled in the art is to be aware that, the technical solutions of this application may be implemented without one or more of the particular details, or another method, component, apparatus, or step may be used. In other cases, well-known methods, apparatuses, implementations, or operations are not shown or described in detail, to avoid blurring each aspect of this application.

The block diagrams shown in the accompanying drawings are merely functional entities, and are not necessarily corresponding to physically independent entities. That is, the functional entities may be implemented in a software form, or the functional entities may be implemented in one or more hardware modules or integrated circuits, or the functional entities may be implemented in different networks and/or processor devices and/or microcontroller devices.

The flowcharts shown in the accompanying drawings are merely exemplary descriptions, and not all content and operations/steps need to be included. In addition, the operations/steps does not need to be performed in the described sequence. For example, some operations/steps may be further divided, and some operations/steps may be combined or partially combined. Therefore, an actual execution sequence may change according to an actual case.

Figure 1:
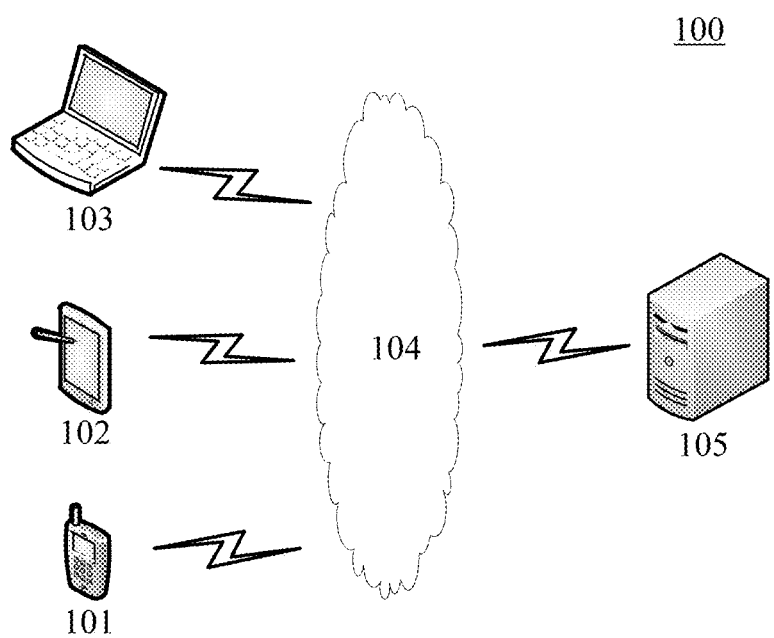
FIG. 1 is a schematic diagram of an exemplary system architecture to which a message digest generation method or a message digest generation apparatus according to the embodiments of this application may be applied.

FIG. 1 is a schematic diagram of an exemplary system architecture 100 to which a message digest generation method or a message digest generation apparatus according to the embodiments of this application may be applied.

As shown in FIG. 1, the system architecture 100 may include one or more of terminal devices 101, 102, and 103, a network 104, and a server 105. The network 104 is used for providing a communications link between the terminal devices 101, 102, and 103 and the server 105. The network 104 may include various connection types, for example, a wired communications link and a wireless communications link.

It is to be understood that, the quantities of the terminal devices, the networks, and the servers in FIG. 1 are merely exemplary. According to an implementation requirement, any quantity of terminal devices, networks, and servers may be included. For example, the server 105 may be a server cluster including a plurality of servers.

A user may interact with the server 105 through the network 104 using the terminal devices 101, 102, and 103, to receive or send a message. The terminal devices 101, 102, and 103 may be various electronic devices having display screens, including but not limited to smartphones, tablets, portable computers, desktop computers, and the like.

The server 105 may be a server providing various services, for example, an electronic device providing a computing service. For example, the user uploads a to-be-processed message set to the server 105 using the terminal device 103 (or the terminal device 101 or 102). The server 105 may obtain a plurality of messages having an association relationship from the message set; then generate a function label distribution model, a sentiment label distribution model, a word category label distribution model, and a word sentiment polarity label distribution model corresponding to each of the plurality of messages, the word category label distribution model representing a probability that messages having different function labels include words of various categories, and the word sentiment polarity label distribution model representing a probability that messages having different sentiment labels include words of various sentiment polarities; and further may determine, based on the generated function label distribution model, sentiment label distribution model, word category label distribution model, and word sentiment polarity label distribution model, a distribution probability that a category of a word included in the plurality of messages is a subject content word, to generate a digest of the plurality of messages according to the distribution probability of the subject content word.

The message digest generation method provided in the embodiments of this application is generally performed by the server 105. Correspondingly, the message digest generation apparatus is generally disposed in the server 105. However, in other embodiments of this application, the terminal may also have a function similar to that of the server, thereby performing a message digest generation solution provided in the embodiments of this application.

Figure 2:
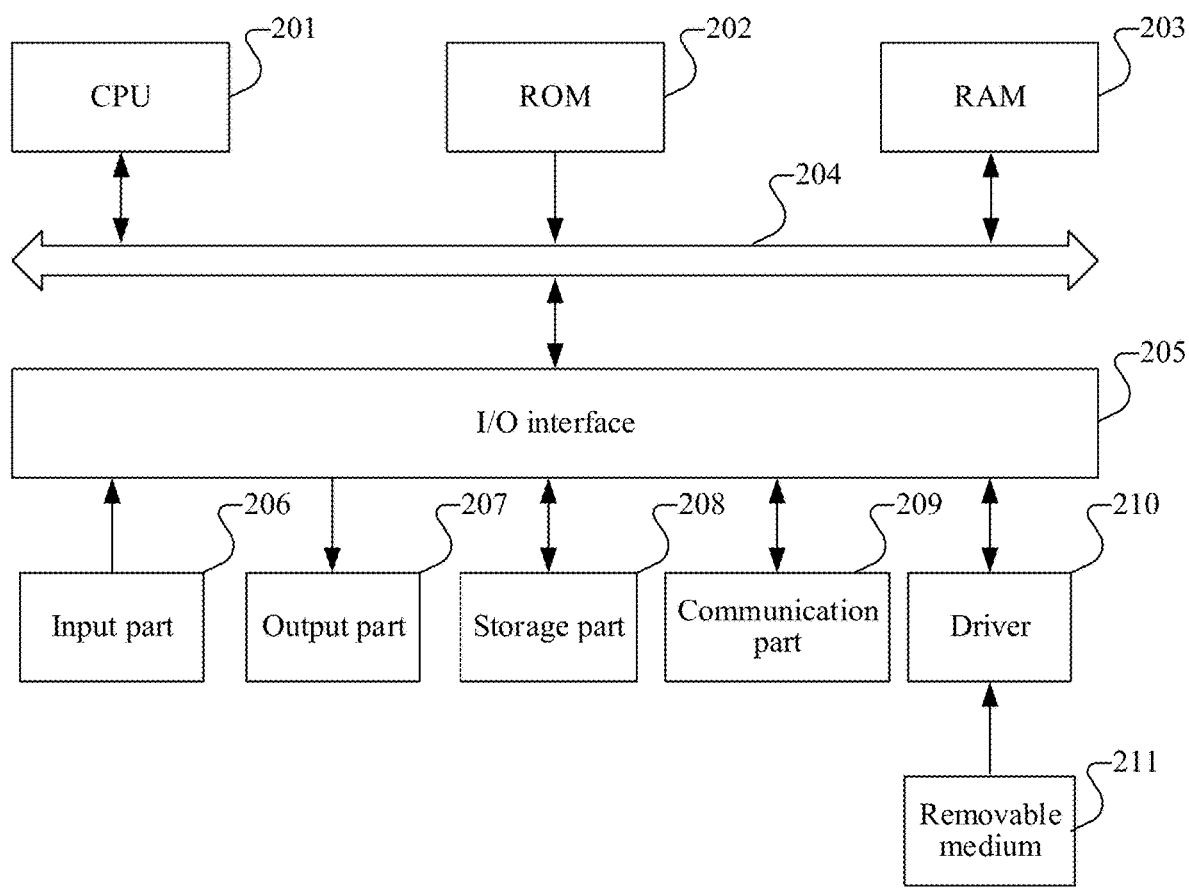
FIG. 2 is a schematic structural diagram of a computer system of an electronic device suitable for implementing the embodiments of this application.

FIG. 2 is a schematic structural diagram of a computer system of an electronic device suitable for implementing the embodiments of this application.

The computer system 200 of the electronic device shown in FIG. 2 is merely an example, and is not to be construed as any limitation on the function and application scope of the embodiments of this application.

As shown in FIG. 2, the computer system 200 includes a central processing unit (CPU) 201, which may perform various proper actions and processing according to a program stored in a read-only memory (ROM) 202 or a program loaded from a storage part 208 into a random access memory (RAM) 203. The RAM 203 further stores various programs and data required to operate the system. The CPU 201, the ROM 202, and the RAM 203 are connected to each other through a bus 204. An input/output (I/O) interface 205 is also connected to the bus 204.

The I/O interface 205 is connected to the following components: an input part 206 including a keyboard, a mouse, and the like; an output part 207 including a cathode ray tube (CRT), a liquid crystal display (LCD), a speaker, and the like; a storage part 208 including a hard disk, and the like; and a communication part 209 including a network interface card such as a LAN card or a modem. The communication part 209 performs communication processing using a network such as the Internet. A driver 210 is also connected to the I/O interface 205 as required. A removable medium 211 such as a magnetic disk, an optical disc, a magneto-optical disk, or a semiconductor memory is mounted on the driver 210 as required, so that a computer program read from the removable medium 211 is installed into the storage part 208 as required.

According to the embodiments of this application, a process described below with reference to the flowchart may be implemented as a computer software program. For example, an embodiment of this application includes a computer program product, including a computer program carried in a computer-readable medium. The computer program includes program code used for performing the method shown in the flowchart. In such an embodiment, using the communication part 209, the computer program may be downloaded and installed from a network, and/or installed from the removable medium 211. When executed by the CPU 201, the computer program performs various functions defined in the computer system in the embodiments of this application.

The computer-readable medium shown in the embodiments of this application may be a computer-readable signal medium or a computer-readable storage medium or any combination thereof. The computer-readable storage medium may be, but not limited to, for example, an electric, magnetic, optical, electromagnetic, infrared, or semi-conductive system, apparatus, or device, or any combination thereof. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination thereof. In the embodiments of this application, the computer-readable storage medium may be any tangible medium including or storing a program, and the program may be used by or in combination with an instruction execution system, apparatus, or device. In the embodiments of this application, the computer-readable signal medium may include a data signal propagated in a baseband or as part of a carrier, and carries computer-readable program code. The propagated data signal may be in a plurality of forms, including but not limited to an electromagnetic signal, an optical signal, or any appropriate combination thereof. The computer-readable signal medium may be alternatively any computer-readable medium other than the computer-readable storage medium. The computer-readable medium may send, propagate, or transmit a program configured to be used by or in combination with an instruction execution system, apparatus, or device. The program code included in the computer-readable medium may be transmitted using any suitable medium, including but not limited to a wireless medium, a wired medium, or any appropriate combination thereof.

The flowcharts and block diagrams in the accompanying drawings show architectures, functions, and operations that may be implemented for the system, the method, and the computer program product according to the embodiments of this application. In this regard, each block in the flowchart or the block diagram may represent a module, a program segment, or a part of code. The module, the program segment, or the part of code includes one or more executable instructions used for implementing specified logic functions. In some alternative implementations, functions annotated in blocks may alternatively occur in a sequence different from that annotated in the accompanying drawings. For example, actually two blocks shown in succession may be performed basically in parallel, and sometimes the two blocks may also be performed in a reverse sequence. This is determined by a related function. Each block in the block diagram or the flowchart and a combination of blocks in the block diagram or the flowchart may be implemented using a dedicated hardware-based system configured to perform a specified function or operation, or may be implemented using a combination of dedicated hardware and a computer instruction.

The units described in the embodiments of this application may be implemented in a software manner, or may be implemented in a hardware manner, and the described units may also be disposed in a processor. Names of these units do not constitute a limitation on the units in a case.

The embodiments of this application further provide an electronic device, including one or more processors and a storage apparatus, the storage apparatus being configured to store one or more executable program instructions; and the one or more processors being configured to execute the one or more executable program instructions in the storage apparatus, to implement the message digest generation method.

The embodiments of this application further provide a storage medium, for example, a computer-readable medium. The computer-readable medium may be included in the electronic device described in the foregoing embodiments, or may exist alone and is not assembled in the electronic device. The computer-readable medium stores one or more processor-executable program instructions, the one or more processor-executable program instructions, when executed by the one or more processors of the electronic device, causing the electronic device to implement the method in the following embodiments. For example, the electronic device may implement steps shown in FIG. 3 to FIG. 8 and FIG. 10.

Figure 3:
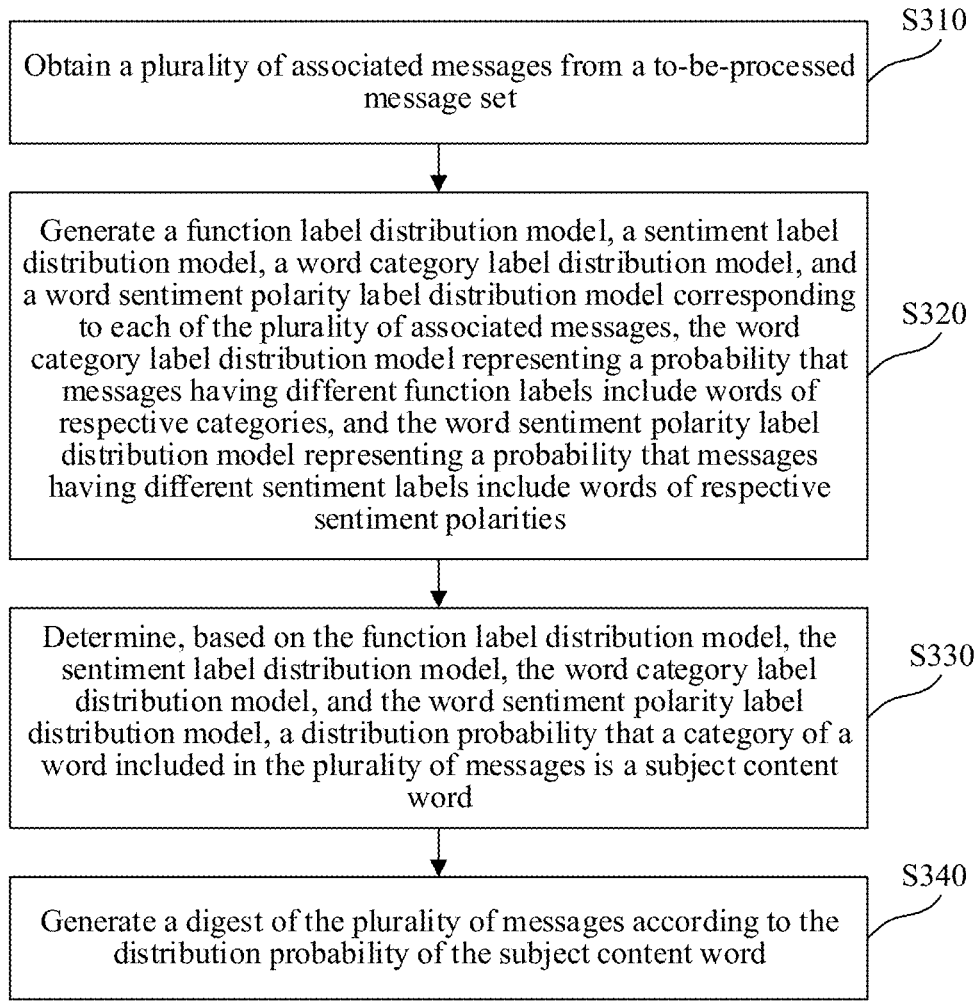
FIG. 3 is a schematic flowchart of a message digest generation method according to an embodiment of this application.

Implementation details of the technical solutions of the embodiments of this application are described in detail below:

FIG. 3 is a schematic flowchart of a message digest generation method according to an embodiment of this application. The message digest generation method is performed by the electronic device in the foregoing embodiments. Referring to FIG. 3, the message digest generation method includes at least step S310 to step S340. Detailed descriptions are provided below:

In step S310, a plurality of messages having an association relationship are obtained from a to-be-processed message set.

In an embodiment of this application, a message is usually replied or forwarded around a similar or related subject. Therefore, according to the replying and/or forwarding relationship between the messages, a plurality of messages having the replying and/or forwarding relationship may be obtained from the message set. In this way, a context of the message can be reasonably expanded, to ensure that a more accurate message digest is obtained.

In an embodiment of this application, a message tree corresponding to the plurality of messages may be alternatively generated based on the replying and/or forwarding relationship between the plurality of messages. Specifically, each message may be used as one node. For any message m, if there is another message m', and m' is a forward or a reply of m, an edge from m to m' is constructed, to generate the message tree.

In the foregoing embodiments, the plurality of messages are obtained from the message set based on the replying and/or forwarding relationship. In another embodiment of this application, the plurality of messages having the association relationship may be alternatively obtained according to whether the messages are sent from the same author, whether the messages include a common word, whether the messages include a label, and the like.

In addition, in an embodiment of this application, messages in the to-be-processed message set may be alternatively grouped into at least one group of messages according to the association relationship, and each group of messages includes a plurality of messages. For each of the at least one group of messages, a message digest may be determined according to the technical solutions in the embodiments of this application.

Still referring to FIG. 3, in step S320, a function label distribution model, a sentiment label distribution model, a word category label distribution model, and a word sentiment polarity label distribution model corresponding to each of the plurality of messages are generated, the word category label distribution model representing a probability that messages having different function labels include words of various categories, and the word sentiment polarity label distribution model representing a probability that messages having different sentiment labels include words of various sentiment polarities.

In an embodiment of this application, a function label is used for indicating a function of a message, such as statement, question, and doubt; a sentiment label is used for indicating a sentiment conveyed by a message, such as happiness, anger, and sadness; a word category label is used for indicating a type of a word in a message, such as a subject content word, a function word, a sentiment word, or a background word (the background word is a word other than the subject content word, the function word, and the sentiment word); and a word sentiment polarity label is used for indicating a sentiment polarity of a word in a message, such as positive and negative.

In this embodiment of this application, a function label distribution model, a sentiment label distribution model, a word category label distribution model, and a word sentiment polarity label distribution model corresponding to each message are generated, so that when a distribution probability of a subject content word is determined, a probability that messages having different function labels include the subject content word can be considered, and a word category label and a word sentiment polarity label can be determined to reduce a probability of a non-subject content word (such as a background word, a function word, and a sentiment word) in a subject content word distribution, thereby ensuring that a more accurate message digest can be obtained, ensuring that the message digest can include more important content, and improving the quality of the determined message digest.

Figure 4:
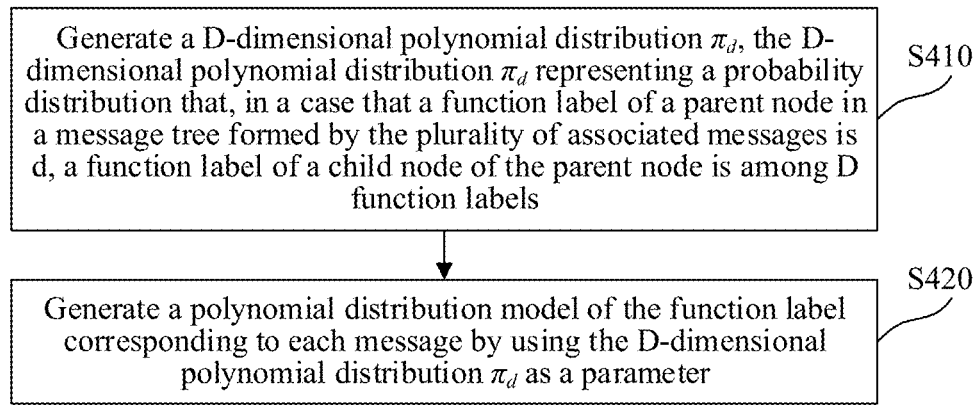
FIG. 4 is a schematic flowchart of generating a function label distribution model corresponding to each message according to an embodiment of this application.

For the function label distribution model, the sentiment label distribution model, the word category label distribution model, and the word sentiment polarity label distribution model, the embodiments of this application respectively provide the following generation methods:

Generate a function label distribution model:

In an embodiment of this application, referring to FIG. 4, the generating a function label distribution model corresponding to each message includes the following steps:

Step S410: Generate a D-dimensional polynomial distribution $\pi_d$, the D-dimensional polynomial distribution $\pi_d$ representing a probability distribution that, in a case that a function label of a parent node in a message tree formed by the plurality of messages is d, a function label of a child node of the parent node is among D function labels.

In this embodiment of this application, D dimensions represent the quantity of message function categories, which may be greater than or equal to 2. For example, the message functions may include: statement, doubt, propagation, and the like, and then a value of D may be set according to the quantity of the message functions.

Step S420: Generate a polynomial distribution model of the function label corresponding to each message using the D-dimensional polynomial distribution $\pi_d$ as a parameter.

Figure 5:
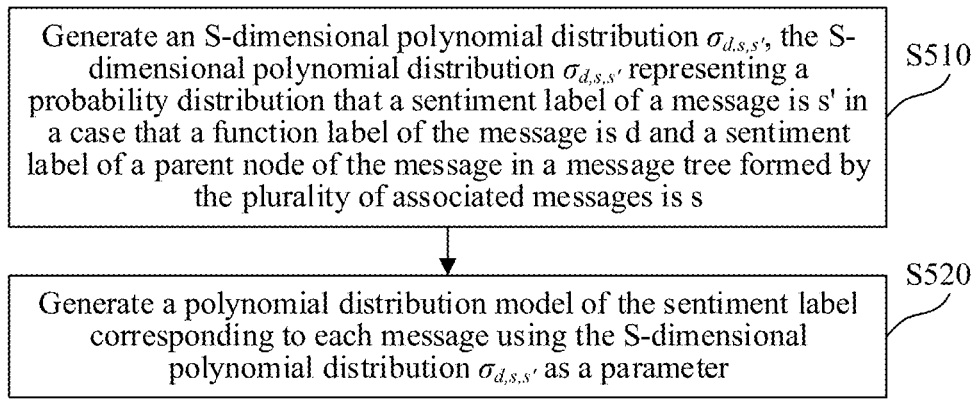
FIG. 5 is a schematic flowchart of generating a sentiment label distribution model corresponding to each message according to an embodiment of this application.

Generate a sentiment label distribution model:

In an embodiment of this application, referring to FIG. 5, the generating a sentiment label distribution model corresponding to each message includes the following steps:

Step S510: Generate an S-dimensional polynomial distribution $\sigma_{d,s,s'}$, the S-dimensional polynomial distribution $\sigma_{d,s,s'}$ representing a probability distribution that a sentiment label of each message is s' in a case that a function label of each message is d and a sentiment label of a parent node in a message tree formed by the plurality of messages is s.

In this embodiment of this application, S dimensions represent the quantity of message sentiment categories, which may be greater than or equal to 2. For example, S=2 may represent that the sentiment categories include positive and negative, and S=3 may represent that the sentiment categories include positive, negative, and neutral. When the value of S is greater, it may represent that the sentiment categories include anger, happiness, madness, depression, and the like.

Step S520: Generate a polynomial distribution model of the sentiment label corresponding to each message using the S-dimensional polynomial distribution $\sigma_{d,s,s'}$ as a parameter.

Figure 6:
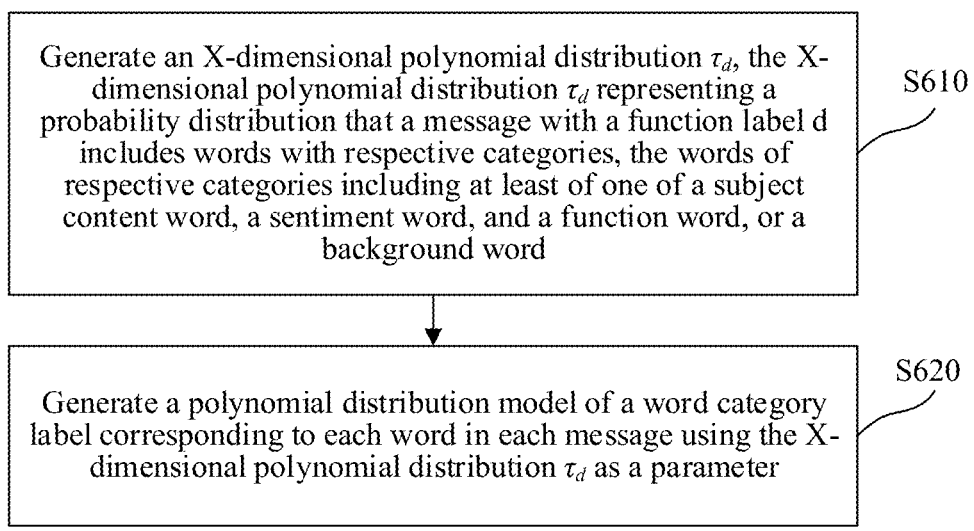
FIG. 6 is a schematic flowchart of generating a word category label distribution model corresponding to each message according to an embodiment of this application.

Generate a word category label distribution model:

In an embodiment of this application, referring to FIG. 6, the generating a word category label distribution model corresponding to each message includes the following steps:

Step S610: Generate an X-dimensional polynomial distribution $\tau_d$, the X-dimensional polynomial distribution $\tau_d$ representing a probability distribution that a message with a function label d includes words of various categories, the words of various categories including a subject content word, a sentiment word, and a function word, or including a subject content word, a sentiment word, a function word, and a background word.

In an embodiment of this application, if the words of various categories include a subject content word, a sentiment word, and a function word, the X-dimensional polynomial distribution $\tau_d$ is a three-dimensional polynomial distribution; and if the words of various categories include a subject content word, a sentiment word, a function word, and a background word, the X-dimensional polynomial distribution $\tau_d$ is a four-dimensional polynomial distribution. In this embodiment of this application, the word may be formed by a single character, or may be formed by a plurality of characters (for example, the word may be a phrase).

Step S620: Generate a polynomial distribution model of a word category label corresponding to each word in each message using the X-dimensional polynomial distribution $\tau_d$ as a parameter.

Figure 7:
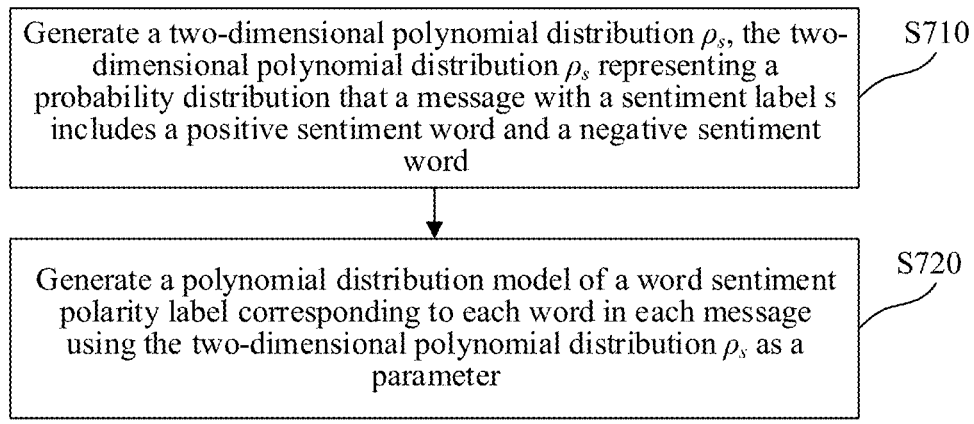
FIG. 7 is a schematic flowchart of generating a word sentiment polarity label distribution model corresponding to each message according to an embodiment of this application.

Generate a word sentiment polarity label distribution model:

In an embodiment of this application, referring to FIG. 7, the generating a word sentiment polarity label distribution model corresponding to each message includes the following steps:

Step S710: Generate a two-dimensional polynomial distribution $\rho_s$, the two-dimensional polynomial distribution $\rho_s$ representing a probability distribution that a message with a sentiment label s includes a positive sentiment word and a negative sentiment word.

Step S720: Generate a polynomial distribution model of a word sentiment polarity label corresponding to each word in each message using the two-dimensional polynomial distribution $\rho_s$ as a parameter.

In an embodiment of this application, if a sentiment dictionary is set in advance, and positive sentiment words and/or negative sentiment words are identified in the sentiment dictionary, if a target word matching a positive sentiment word and/or a negative sentiment word included in the sentiment dictionary exists in the plurality of messages, a word sentiment polarity label of the target word may be directly set according to a sentiment polarity of the matched word.

Still referring to FIG. 3, in step S330, a distribution probability that a category of a word included in the plurality of messages is a subject content word is determined based on the function label distribution model, the sentiment label distribution model, the word category label distribution model, and the word sentiment polarity label distribution model.

In an embodiment of this application, during specific implementation, step S330 may include: performing iterative sampling on the function label distribution model, the sentiment label distribution model, the word category label distribution model, and the word sentiment polarity label distribution model, to obtain the distribution probability that the category of the word included in the plurality of messages is a subject content word. For example, iterative sampling may be performed on the function label distribution model, the sentiment label distribution model, the word category label distribution model, and the word sentiment polarity label distribution model using a Gibbs sampling algorithm.

Figure 8:
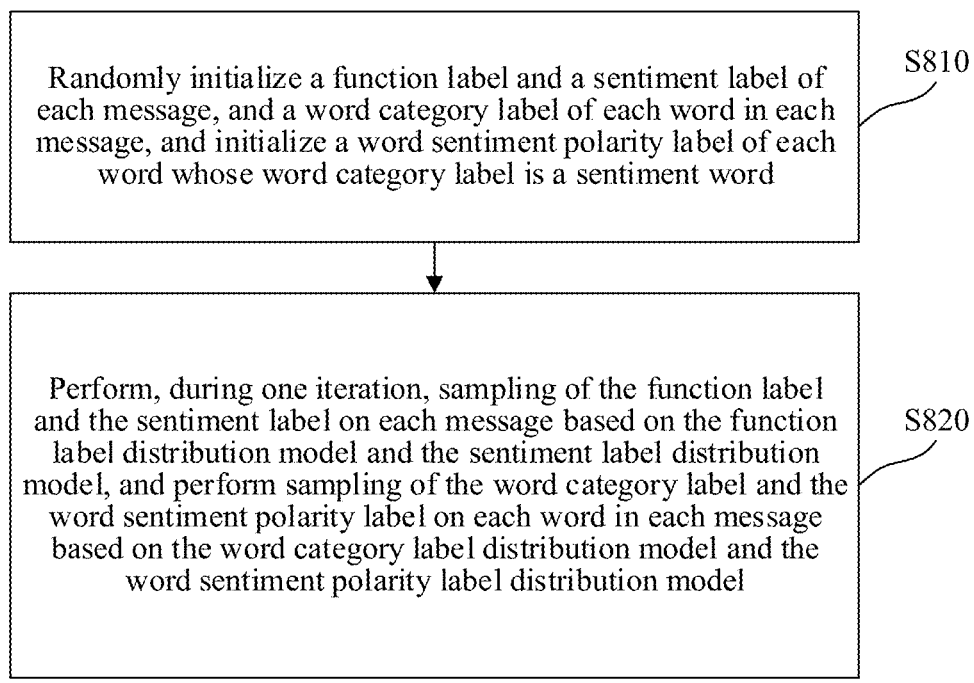
FIG. 8 is a schematic flowchart of performing iterative sampling on a function label distribution model, a sentiment label distribution model, a word category label distribution model, and a word sentiment polarity label distribution model according to an embodiment of this application.

In an embodiment of this application, referring to FIG. 8, the process of performing iterative sampling on the function label distribution model, the sentiment label distribution model, the word category label distribution model, and the word sentiment polarity label distribution model based on a Gibbs sampling algorithm includes:

Step S810: Randomly initialize a function label and a sentiment label of each message, and a word category label of each word in each message, and initialize a word sentiment polarity label of each word whose word category label is a sentiment word.

In this embodiment of this application, the Gibbs sampling algorithm is an iterative sampling process. Before the iterative sampling, the function label, the sentiment label, the word category label, and the word sentiment polarity label need to be initialized.

Step S820: Perform, during one iteration, sampling of the function label and the sentiment label on each message based on the function label distribution model and the sentiment label distribution model, and perform sampling of the word category label and the word sentiment polarity label on each word in each message based on the word category label distribution model and the word sentiment polarity label distribution model.

How to perform sampling of the function label and the sentiment label, and how to perform sampling of the word category label and the word sentiment polarity label during one iteration are described in detail below:

The solution to performing sampling of the function label and the sentiment label:

In an embodiment of this application, the performing sampling of the function label and the sentiment label on each message includes: on the basis that the word category label and the word sentiment polarity label of each of the plurality of messages, and the function label and the sentiment label of another of the plurality of messages are predetermined, performing joint sampling of the function label and the sentiment label on each message based on the function label distribution model and the sentiment label distribution model. That is, in this embodiment, sampling of the function label and the sentiment label may be jointly performed.

In another embodiment of this application, the performing sampling of the function label and the sentiment label on each message includes: on the basis that the sentiment label, the word category label, and the word sentiment polarity label of each of the plurality of messages, and the function label of another of the plurality of messages are predetermined, performing sampling of the function label on each message based on the function label distribution model; and on the basis that the function label, the word category label, and the word sentiment polarity label of each of the plurality of messages, and the sentiment label of another of the plurality of messages are predetermined, performing sampling of the sentiment label on each message based on the sentiment label distribution model. That is, in this embodiment, sampling of the function label and the sentiment label may be separately performed. Sampling of the function label may be first performed, and then sampling of the sentiment label may be performed, or sampling of the sentiment label may be first performed, and then sampling of the function label may be performed.

The solution to performing sampling of the word category label and the word sentiment polarity label:

In an embodiment of this application, the performing sampling of the word category label and the word sentiment polarity label on each word in each message includes: on the basis that the function label and the sentiment label of each of the plurality of messages, and the word category label and the word sentiment polarity label of another of the plurality of messages are predetermined, performing sampling of the word category label and the word sentiment polarity label on each word in each message based on the word category label distribution model and the word sentiment polarity label distribution model. That is, in this embodiment, sampling of the word category label and the word sentiment polarity label may be jointly performed.

In another embodiment of this application, the performing sampling of the word category label and the word sentiment polarity label on each word in each message includes: on the basis that the word category label, the function label, and the sentiment label of each of the plurality of messages, and the word sentiment polarity label of another of the plurality of messages are predetermined, performing sampling of the word sentiment polarity label on each word in each message based on the word sentiment polarity label distribution model; and on the basis that the word sentiment polarity label, the function label, and the sentiment label of each of the plurality of messages, and the word category label of another of the plurality of messages are predetermined, performing sampling of the word category label on each word in each message based on the word category label distribution model. That is, in this embodiment, sampling of the word category label and the word sentiment polarity label may be separately performed. Sampling of the word category label may be first performed, and then sampling of the word sentiment polarity label may performed, or sampling of the word sentiment polarity label may be first performed, and then sampling of the word category label may be performed.

In this embodiment of this application, for one iteration, sampling may be first performed for the function label and the sentiment label, and then performed on the word category label and the word sentiment polarity label, or sampling may be first performed for the word category label and the word sentiment polarity label, and then performed for the function label and the sentiment label.

Still referring to FIG. 3, in step S340, a digest of the plurality of messages is generated according to the distribution probability of the subject content word.

In an embodiment of this application, when a digest of a plurality of messages is generated, a predetermined quantity of target messages may be selected from the plurality of messages, relative entropy between a word distribution probability of a word included in a message set formed by the predetermined quantity of target messages in a dictionary and the distribution probability of the subject content word being minimum, the dictionary being formed by all words included in the to-be-processed message set; and then the digest of the plurality of messages is generated according to the predetermined quantity of target messages.

In the technical solution of this embodiment, a predetermined quantity of target messages can be found to generate a digest, ensuring more substantial digest content on the premise that accurate digest content can be generated.

In another embodiment of this application, a predetermined quantity of subject content words may be selected based on the distribution probability of the subject content word to generate the digest of the plurality of messages. For example, at least one subject content word may be selected as a digest in a descending order of probability. Because the technical solution in this embodiment of this application considers the probability that messages having different function labels include the subject content word, and the probability that messages having different sentiment labels include words of various sentiment polarities, a probability of a word of another category in the subject content word distribution is reduced, so that a more accurate subject content word can be ensured when the subject content word is selected in a descending order of probability, thereby obtaining an accurate message digest.

In an application scenario of this application, a message in social media may be processed to determine a message digest, specifically including the following processes: organizing an inputted social media message set into a dialog tree, a model generation process, parameter learning of the model, digest extraction, and the like. The following describes these processes:

1. Organize an Inputted Social Media Message Set into a Dialog Tree

When a social media message set is inputted, messages inputted into a data set are first constructed, based on a replying and a forwarding relationship, into C dialog trees represented by a graph G=(V,E), where V represents a point set, and E represents an edge set. Any point m in the point set V represents one message, and a construction process of the edge set E is as follows:

All messages in the point set V are traversed. For any message m, if there is any other message m', and m' is a forward or a reply of m, an edge from m to m' is constructed and is inserted into the edge set E. In this embodiment of this application, each message in social media (for example, Sina Weibo and WeChat Moments) can reply or forward only one message at most. Therefore, the finally obtained G is a forest including C tree structures, and each tree is defined as a dialog tree.

Figure 9:
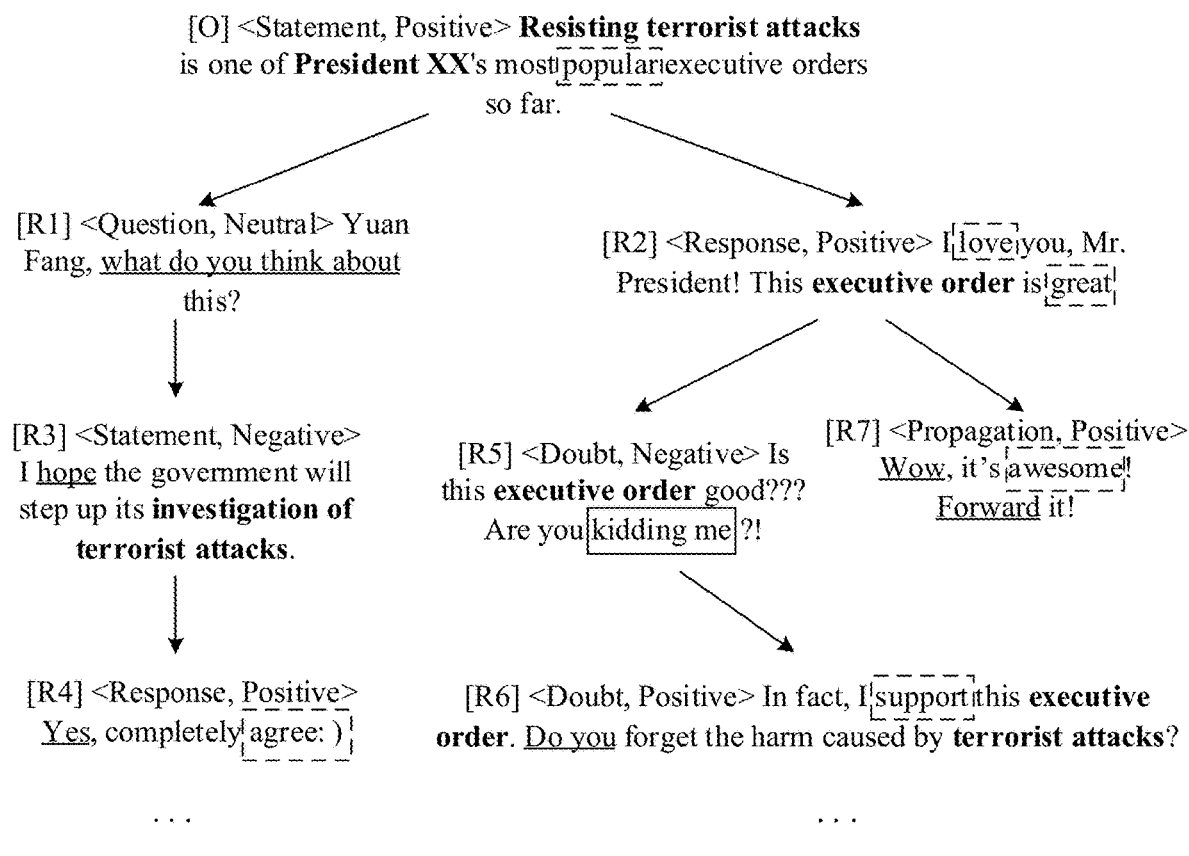
FIG. 9 is a schematic structural diagram of a dialog tree according to an embodiment of this application.

In an embodiment of this application, a part of a generated dialog tree structure may be shown in FIG. 9. Each message is one node in the dialog tree. A message identified with "[O]" represents an original message (that is, not a reply or a forward of another message), and a message identified with "[Ri]" represents a message of an $i^{th}$ forward or reply in a time sequence.

In addition, in the dialog tree structure shown in FIG. 9, content before the comma "," in "< >" represents a function label of the message, and content after the comma "," in "< >" indicates a sentiment label of the message. A bold and font-enlarged word is a word indicating subject content of the message, and an underlined word is a function word representing a function label of the message. A word in a dashed line box represents a positive sentiment word, and a word in a solid line box represents a negative sentiment word.

The technical solutions in this embodiment of this application mainly use the replying relationship in the dialog tree, in combination with information of the function, the sentiment, and the subject content of the message in the constructed dialog tree, to extract distribution of the subject content word in each message to represent mainly discussed content, and extract an important message based on this to form a digest of the dialog tree.

It is to be understood by a person skilled in the art that, in this embodiment, the dialog tree is constructed based on the replying and the forwarding relationship. In an embodiment of this application, the dialog tree may be alternatively constructed only according to the replying relationship, or the dialog tree may be constructed only according to the forwarding relationship.

2. Model Generation Process

In this embodiment of this application, it is assumed that the inputted social media message set includes C dialog trees, and each dialog tree c has $M_c$ messages, where each message (c, m) includes $N_{c,m}$ words, an index of each word (c, m, n) in a dictionary is $w_{c,m,n}$, and a size of the dictionary formed by all words in the inputted message set is V.

In this embodiment of this application, the inputted message set includes D function word distributions and two sentiment word distributions (representing a positive sentiment and a negative sentiment respectively). A polynomial distribution of each function word is represented by $\phi_d^D$ (d=1, 2, . . . D), and a polynomial distribution of each sentiment polarity word is represented by $\phi_p^P$ (p=POS, NEG), where POS represents a positive sentiment, and NEG represents a negative sentiment. Content of each dialog tree c is represented by a polynomial distribution $\phi_c^C$ of a content word. In this embodiment of this application, a polynomial distribution $\phi^B$ of another word is added to represent non-sentiment, non-function, and non-subject content information. $\phi_c^C$, $\phi_d^D$, $\phi_p^P$, and $\phi^B$ are all word distributions in the dictionary Vocab, and their prior distributions are all Dir(β), where a size of Vocab is V, and β represents a hyperparameter (in a context of machine learning, a hyperparameter is a parameter for setting a value before a learning process starts).

In this embodiment of this application, a message (c, m) in any dialog tree c has two labels $d_{c,m}$ and $s_{c,m}$, and the two labels respectively represent a function category and a sentiment category of the message (c, m). $D_{c,m}$ represents a function index ($d_{c,m} \in \{1, 2, \ldots D\}$) of the message (c, m). To describe a dependency relationship between the function label in the message (c, m) and its parent node (for example, if a message "asks a question", a possibility of "answering the question" is higher than a possibility of "doubting" in its reply or forward). In this embodiment of this application, a D-dimensional polynomial distribution $\pi_d \sim Dir(\gamma)$ is used for representing a probability that, when a function index of a parent node in the dialog tree c is d, a child node of the parent node is D function indexes. Therefore, the function index of the message (c, m) is $$d_{c,m} \sim Multi(\pi_{d_{c,pa(m)}}),$$

where pa(m) represents a parent node of the message (c, m), and the foregoing γ represents a hyperparameter.

$s_{c,m}$ indicates a sentiment index ($s_{c,m} \in \{1, 2, \ldots S\}$) of the message (c, m), where S is a quantity of message sentiment categories and may be greater than or equal to 2. For example, S=3 represents that there are three message sentiment categories (for example, positive, negative, and neutral may be included). To describe an impact of the message function on sentiment transfer between a parent node and a child node, for example, in a message, "doubting" has a higher probability to invoke a sentiment change than that of "echoing". In this embodiment of this application, an S-dimensional polynomial distribution $\sigma_{d,s,s'} \sim Dir(\xi)$ is used for representing a relationship between the message function and the sentiment transfer between a parent node and a child node in a dialog tree, to represent a probability that, when a function index of a message is d and a sentiment index of a parent node is s, a sentiment index of the message is s'. Therefore, it is made that $$s_{c,m} \sim Multi(\pi_{d_{c,m},s_{c,pa(m)}}),$$

where the foregoing ξ represents a hyperparameter.

In this embodiment of this application, for any word (c, m, n) in the message (c, m), there are three labels $x_{c,m,n}$, $p_{c,m,n}$, and $w_{c,m,n}$, where $x_{c,m,n}$ indicates a category of the word (c, m, n), and $x_{c,m,n} \in \{DISC, CONT, SENT, BACK\}$.

When $x_{c,m,n}$=DISC, the word (c, m, n) is a function word used for indicating a function of the message (c, m). For example, in a message "How do you know?", "how" and "?" are function words used for indicating that a discourse label of the message is "asking a question".

When $x_{c,m,n}$=CONT, the word (c, m, n) is a subject content word used for indicating subject content of the message (c, m). For example, in a message "Li Si was elected President of State J", "Li Si", "State J", and "President" are subject content words and indicate that content of the message is related to presidential election of State J.

When $x_{c,m,n}$=SENT, the word (c, m, n) is a sentiment word used for representing a sentiment of the message (c, m). For example, in a message "Ha ha, I really enjoy today's party /\_/\", "Ha ha", "enjoy", and "/\_/\" are sentiment words and represent that the message is a positive sentiment.

When $x_{c,m,n}$=BACK, the word (c, m, n) is not a function word, a sentiment word, nor a subject content word. For example, in the message "How do you know?", "do" is not a function word, a sentiment word, nor a subject word, and may be regarded as a background word.

$p_{c,m,n} \in \{POS, NEG\}$ is valid only when the word (c, m, n) is a sentiment word. That is, when $x_{c,m,n}$=SENT, $p_{c,m,n}$ is used as a sentiment indicator to indicate a sentiment polarity of the word (c, m, n), where $p_{c,m,n}$=POS represents that the word (c, m, n) is a positive sentiment word, and $p_{c,m,n}$=NEG represents that the word (c, m, n) is a negative sentiment word. To describe different probabilities that messages of different sentiment categories include a positive sentiment word and a negative sentiment word, in this embodiment of this application, a two-dimensional polynomial distribution $\rho_s \sim Dir(\omega)$ is used for describing a distribution of a positive sentiment word and a negative sentiment word included in a message when a sentiment category of the message is s. Therefore, the sentiment polarity indicator of the word (c, m, n) is $p_{c,m,n} \sim Multi(\rho_{s_{c,m}})$. To improve the indication accuracy of the positive sentiment word and the negative sentiment word, in this embodiment of this application, positive sentiment words and negative sentiment words in a sentiment dictionary may be used for assisting the determining. For example, when the word (c, m, n) is a positive sentiment word in the predetermined sentiment dictionary, it may be forcibly made that $p_{c,m,n}$=POS; and when the word (c, m, n) is a negative sentiment word in the know sentiment dictionary, it may be forcibly made that $p_{c,m,n}$=NEG.

$w_{c,m,n}$ represents an index of the word (c, m, n) in a word list. When $x_{c,m,n}$=DIS, $w_{c,m,n} \sim Multi(\phi_{d_{c,m}}^D)$; when $x_{c,m,n}$=CONT, $w_{c,m,n} \sim Multi(\phi_c^C)$; when $x_{c,m,n}$=SENT, $w_{c,m,n} \sim Multi(\phi_{p_{c,m,n}}^P)$; and when $x_{c,m,n}$=BACK, $w_{c,m,n} \sim Multi(\phi^B)$. In this embodiment of this application, it is assumed that the category $x_{c,m,n}$ of the word is related to the function of the message (c, m). For example, when the function of the message (c, m) is "statement", a possibility of including a subject content word is higher than that of "asking a question". Therefore, $x_{c,m,n}$~Multi($\tau_{d_{c,m}}$), and $\tau_d$~Dir($\delta$) is a four-dimensional polynomial distribution, representing a probability that a message whose function label is d include a function word (DISC), a subject content word (CONT), a sentiment word (SENT), and a background word (BACK).

In summary, for an inputted social media message set, a model generation process is as follows:

For d=1, 2, . . . , D:
 Generate a polynomial word distribution $\phi_d^D$~Dir($\beta^D$) of a $d^{th}$ function
 Generate a background word distribution $\phi^B$~Dir($\beta^B$)
For c=1, 2, . . . , C:
 Generate a content word distribution $\phi_c^C$~Dir($\alpha$) in a dialog tree c
 For m=1, 2, . . . , $M_c$:
  Generate a function label $d_{c,m}$~Multi($\pi_{d_{c,p(m)}}$) of a message (c, m)
  Generate a sentiment label $s_{c,m}$~Multi($\sigma_{d_{c,m},s_{s,pa(m)}}$) of a message (c, m)
  For n=1, 2, . . . , $N_{c,m}$:
   Generate a word category indicator $x_{c,m,n}$~Multi($\tau_{d_{c,m,n}}$) of a word (c, m, n)
   If $x_{c,m,n}$=DISC;
    $w_{c,m,n}$~Multi($\phi_{d_{c,m}}^D$)
   If $x_{c,m,n}$=CONT;
    $w_{c,m,n}$~Multi($\phi_c^C$)
   If $x_{c,m,n}$=SENT;
    If (c, m, n) is a positive sentiment word in a predetermined sentiment dictionary;
     $p_{c,m,n}$=POS
    Else if (c, m, n) is a negative sentiment word in the predetermined sentiment dictionary;
     $p_{c,m,n}$=NEG
    Else: $p_{c,m,n}$~Multi($\rho_{s_{c,m}}$)
     $w_{c,m,n}$~Multi($\phi_{p_{c,m,n}}$)
   If $x_{c,m,n}$=BACK:
    $w_{c,m,n}$~Multi($\phi^B$)

3. Parameter Learning Process of a Model

In this embodiment of this application, a Gibbs sampling algorithm may be used for performing iterative learning on the parameter in the model. Before the iteration starts, variables d and s of each message are initialized, and variables x and p of each word in each message are initialized.

During each iteration, the variables d and s of each message in the inputted message set are sampled according to the following formula (1), and the variables x and p of each word in each message in the inputted message set are sampled according to the following formula (2).

Specifically, a hyperparameter set $\theta=\{\gamma,\delta,\xi,\beta,\omega\}$ is given. For a message m in a dialog tree c, a sampling formula of its function label $d_{c,m}$ and sentiment label $s_{c,m}$ is as follows:

$$p(d_{c,m} = d, s_{c,m} = s \mid d_{\neg(c,m)}, s_{\neg(c,m)}, w, x, p, \theta) \propto \quad (1)$$

$$\frac{\Gamma\left(C_{d_{c,pa(m)},(\cdot)}^{DD} + D\cdot\gamma\right)}{\Gamma\left(C_{d_{c,pa(m)},(\cdot)}^{DD} + I(d_{c,pa(m)} \neq d) + D\cdot\gamma\right)} \cdot$$

$$\frac{\Gamma\left(C_{d_{c,pa(m)},(d)}^{DD} + I(d_{c,pa(m)} \neq d) + \gamma\right)}{\Gamma\left(C_{d_{c,pa(m)},(d)}^{DD} + D\cdot\gamma\right)} \cdot$$

$$\frac{\Gamma\left(C_{d,(\cdot)}^{DD} + D\cdot\gamma\right)}{\Gamma\left(C_{d,(\cdot)}^{DD} + I(d_{c,pa(m)} = d) + N_{(\cdot)}^{DD} + D\cdot\gamma\right)} \cdot$$

-continued $$\prod_{d'=1}^{D} \frac{\Gamma(C_{d,(d')}^{DD} + I(d_{c,pa(m)} = d = d') + N_{(d')}^{DD} + \gamma)}{\Gamma(C_{d,(d')}^{DD} + \gamma)} \cdot$$

$$\frac{\Gamma\left(C_{d,s_{c,pa(m)},(\cdot)}^{DS} + S\xi\right)}{\Gamma\left(C_{d,s_{c,pa(m)},(\cdot)}^{DS} + I(s_{c,pa(m)} \neq s) + S\xi\right)} \cdot$$

$$\frac{\Gamma\left(C_{d,s_{c,pa(m)},s}^{DS} + I(s_{c,pa(m)} \neq s) + \xi\right)}{\Gamma\left(C_{d,s_{c,pa(m)},(s)}^{DS} + \xi\right)} \cdot$$

$$\prod_{d'=1}^{D} \frac{\Gamma(C_{d',s,(\cdot)}^{DS} + S\xi)}{\Gamma(C_{d',s,(\cdot)}^{DS} + N_{(d',\cdot)}^{DS} + I(d = d') \cdot I(s_{c,pa(m)} = s) + S\xi)} \cdot$$

$$\prod_{s'=1}^{S} \frac{\Gamma(C_{d',s,(s')}^{DS} + N_{(d',s')}^{DS} + I(d = d') \cdot I(s_{c,pa(m)} = s = s') + \xi)}{\Gamma(C_{d',s,s'}^{DS} + \xi)} \cdot$$

$$\frac{\Gamma(C_{d,(\cdot)}^{DW} + V\beta)}{\Gamma(C_{d,(\cdot)}^{DW} + N_{(\cdot)}^{DS} + V\beta)} \cdot$$

$$\prod_{v=1}^{V} \frac{\Gamma(C_{d,(\cdot)}^{DW} + N_{(v)}^{DW} + \beta)}{\Gamma(C_{d,(\cdot)}^{DW} + \beta)} \cdot \frac{\Gamma(C_{s,(\cdot)}^{SP} + 2\omega)}{\Gamma(C_{s,(\cdot)}^{SP} + N_{(\cdot)}^{SP} + 2\omega)} \cdot$$

$$\prod_{p \in \{POS,NEG\}} \frac{\Gamma(C_{s,(p)}^{SP} + N_{(p)}^{SP} + \omega)}{\Gamma(C_{s,(p)}^{SP} + \omega)} \cdot$$

$$\frac{\Gamma(C_{d,(\cdot)}^{DX} + 4\delta)}{\Gamma(C_{d,(\cdot)}^{DX} + N_{(\cdot)}^{DX} + 4\delta)} \cdot \prod_{x=0}^{3} \frac{\Gamma(C_{d,(x)}^{DX} + N_{(x)}^{DX} + \delta)}{\Gamma(C_{d,(x)}^{DX} + \delta)}$$

In the formula (1), $p(d_{c,m}=d, s_{c,m}=s \mid d_{\neg(c,m)}, s_{\neg(c,m)}, w, x, p, \theta)$ represents a probability that, on the basis that $d_{\neg(c,m)}$, $s_{\neg(c,m)}$, w, x, p, and $\theta$ are predetermined, a function label of a message (c, m) is d, and a sentiment label of the message (c, m) is s. $d_{\neg(c,m)}$ represents a function label of another message other than the message (c, m); $s_{\neg(c,m)}$ represents a sentiment label of another message other than the message (c, m); w represents all words in the inputted message set; x represents a word category (that is, whether a word is a subject content word, a function word, a sentiment word, or a background word); p represents a word sentiment polarity (that is, whether a word is positive or negative); and $\theta$ represents a set of all hyperparameters, including $\beta$, $\gamma$, $\delta$, $\omega$, and $\xi$. In the formula (1), the value of the function I( ) is 1 when the condition in "( )" is true; and the value of the function I( ) is 0 when the condition in "( )" is not true. For descriptions of other parameters in the formula (1), refer to the following Table 1.

During each iteration, the word category indicator x (c, m, n) and the sentiment polarity indicator p (c, m, n) of each message in the inputted message set need to be further sampled according to the following formula (2):

$$p(x_{c,m,n} = x, p_{c,m,n} = p \mid x_{\neg(c,m,n)}, p_{\neg(c,m,n)}, w, d, s, \theta) \propto \quad (2)$$

$$\frac{C_{d_{c,m},(x)}^{DX} + \delta}{C_{d_{c,m},(\cdot)}^{DX} + 4\cdot\delta} \cdot g(x, p, c, m)$$

In the formula (2), $p(x_{c,m,n}=x, p_{c,m,n}=p|x_{\neg(c,m,n)}, p_{\neg(c,m,n)}, w,d,s,\theta)$ represents a probability that, on the basis that $x_{\neg(c,m,n)}, p_{\neg(c,m,n)}$, w, d, s, and $\theta$ are predetermined, a word category label of a word (c, m, n) is x, and a word sentiment polarity label of the word (c, m, n) is p. $x_{\neg(c,m,n)}$ represents a word category label of another word other than the word (c, m, n); $p_{\neg(c,m,n)}$ represents a word sentiment polarity label of another word other than the word (c, m, n); w represents all words in the inputted message set; d represents a function label of a message in the inputted message set; s represents a sentiment label of a message in the inputted message set; and $\theta$ represents a set of all hyperparameters, including $\beta$, $\gamma$, $\delta$, $\omega$, and $\xi$.

The function g(x, p, c, m) in the formula (2) is determined according to the formula (3):

$$g(x,p,c,m) = \begin{cases} \dfrac{C_{s_c,m,(p)}^{SP}+\omega}{C_{s_c,m,(\cdot)}^{SP}+2\omega} \cdot \dfrac{C_{p,(w_{c,m,n})}^{PW}+\beta}{C_{p,(\cdot)}^{PW}+V\cdot\beta} & \text{if } x == \text{SENT} \\[6pt] \dfrac{C_{d,(w_{c,m,n})}^{DW}+\beta}{C_{d,(\cdot)}^{DW}+V\beta} & \text{if } x == \text{DISC} \\[6pt] \dfrac{C_{c,(w_{c,m,n})}^{CW}+\beta}{C_{c,(\cdot)}^{CW}+V\cdot\beta} & \text{if } x == \text{CONT} \\[6pt] \dfrac{C_{(w_{c,m,n})}^{Bw}+\beta}{C_{(\cdot)}^{Bw}+V\beta} & \text{if } x == \text{BACK} \end{cases} \quad (3)$$

For descriptions of other parameters in the formula (1), the formula (2), and the formula (3), refer to the following Table 1. (c, m) represents a message m in a dialog tree c, and statistical quantities represented by all C symbols do not include the message (c, m) and all words included in the message (c, m).

| | |
|---|---|
| x | Word category indicator, x = C: a sentiment word (SENT) indicating a sentiment; x = 1: a function word (DISC) indicating a function; x = 2: a subject content word (CONT) indicating content; x = 3: a background word (BACK). |
| I(·) | 01 indicator. When the condition in parentheses are satisfied, the value is 1; otherwise, the value is 0 |
| $C_{d,(x)}^{DX}$ | Quantity of words with a word category x included in a message with a function label d |
| $C_{d,(\cdot)}^{DX}$ | Quantity of words included in a message with a function label d, that is, $C_{d,(\cdot)}^{DX} = \Sigma_{x=0}^{3} C_{d,(x)}^{DX}$ |
| $N_{(x)}^{DX}$ | Quantity of words with a category x included in a message (c, m) |
| $N_{(\cdot)}^{DX}$ | Quantity of words included in a message (c, m), that is, $N_{(\cdot)}^{DX} = \Sigma_{x=0}^{3} N_{(x)}^{DX}$ |
| $C_{p,(v)}^{PW}$ | Quantity of words with a sentiment polarity p and an index v in the dictionary |
| $C_{p,(\cdot)}^{PW}$ | Quantity of words with a sentiment polarity p |
| $C_{d,s,s'}^{DS}$ | Quantity of messages with a function label d, a sentiment label s', and a parent node whose sentiment label is s |
| $C_{d,s,(\cdot)}^{DS}$ | Quantity of messages with a function label d and a parent node whose sentiment label is s, that is $C_{d,s,(\cdot)}^{DS} = \Sigma_{s'=1}^{S} C_{d,s,(s')}^{DS}$ |
| $N_{(d,s)}^{DS}$ | Quantity of messages with a function label d, and a sentiment label s |
| $N_{(d,\cdot)}^{DS}$ | Quantity of messages with a function label d, that is, $N_{(d,\cdot)}^{DS} = \Sigma_{s=1}^{S} N_{(d,s)}^{DS}$ |
| $C_{s,p}^{SP}$ | Quantity of sentiment words (SENT) with a word sentiment polarity label p and with a sentiment label of a message to which the sentiment word belongs being s |
| $C_{s,(\cdot)}^{SP}$ | Quantity of sentiment words (SENT) with a sentiment label of a message to which the sentiment word belongs being s |
| $C_{d,(v)}^{DW}$ | Quantity of words whose word category is a function word (DISC) representing a function, whose index in the dictionary is v, and that is included in a message whose function label is d |
| $C_{d,(\cdot)}^{DW}$ | Quantity of words whose word category is a function word (DISC) representing a function and that is included in a message whose function label is d, that is $C_{d,(\cdot)}^{DW} = \Sigma_{v=1}^{V} C_{d,(v)}^{DW}$ |
| $C_{c,(v)}^{CW}$ | Quantity of words whose word category is a subject content word (CONT) indicating content and whose index in the dictionary is v in a dialog tree c |
| $C_{c,(\cdot)}^{CW}$ | Quantity of words whose word category is a subject content word (CONT) indicating content in a dialog tree c, that is, $C_{c,(\cdot)}^{CW} = \Sigma_{v=1}^{V} C_{c,(v)}^{DW}$ |
| $C_{(v)}^{BW}$ | Quantity of words whose word category is a background word (BACK) and whose index in the dictionary is v |
| $C_{(\cdot)}^{BW}$ | Quantity of words whose word category is a background word (BACK) $C_{(\cdot)}^{BW} = \Sigma_{v=1}^{V} C_{(v)}^{BW}$ |
| $C_{d,(d')}^{DD}$ | Quantity of messages with a function label d' and a parent node whose function label is d |
| $C_{d,(\cdot)}^{DD}$ | Quantity of messages with a parent node whose function label is d, that is, $C_{d,(\cdot)}^{DD} = \Sigma_{d'=1}^{D} C_{d,(d')}^{DD}$ |
| $N_{(d)}^{DD}$ | Quantity of child nodes with a function label d in a message (c, m) |
| $N_{(\cdot)}^{DD}$ | Quantity of child nodes in a message (c, m), that is, $N_{(\cdot)}^{DD} = \Sigma_{d=1}^{D} N_{(d)}^{DD}$ |

When the quantity of iterations are sufficient, that is, a threshold set previously is reached (for example, 1000 iterations), a subject content word distribution of each dialog tree c may be obtained. For details, refer to the following formula (4):

$$\phi_c^C \propto \frac{C_{c,(v)}^{CW}+\beta}{C_{c,(\cdot)}^{CW}+V\cdot\beta} \quad (4)$$

In an embodiment of this application, a positive sentiment word list and/or a negative sentiment word list may be further given, and then in a sampling process, for any word that is sampled as a sentiment word ($x_{c,m,n}$=SENT), a sentiment polarity of the word is forcibly made to be positive ($p_{c,m,n}$=POS); or for any word that is sampled as a sentiment word ($x_{c,m,n}$=SENT), a sentiment polarity of the word is forcibly made to be negative ($p_{c,m,n}$=NEG).

In this embodiment of this application, the process of sampling the variables d and s of each message using the formula (1) and the process of sampling the variables x and p of each word in each message using the formula (2) are not limited to a sequential order. That is, the variables d and s of each message may be first sampled using the formula (1), and then the variables x and p of each word in each message are sampled using the formula (2), or the variables x and p of each word in each message may be first sampled using the formula (2), and then the variables d and s of each message are sampled using the formula (1).

4. Digest Extraction

Based on $\phi_c^C$ obtained in the foregoing process, in this embodiment of this application, L messages may be extracted to form a set $E_c$ as digest content of the dialog tree c. To extract a relatively proper message set $E_c$, in this embodiment of this application, the following formula (5) may be used for ensuring that a proper message set is obtained:

$$E_c^* = \arg\min_{|E_c|=L} KL(\phi_c^C \| U(E_c)) \tag{5}$$

$U(E_c)$ represents a word distribution of a word in $E_c$ in the dictionary Vocab, and $KL(P\|Q)$ represents Kullback-Lieber (KL) divergence, which represents relative entropy between a distribution P and a distribution Q, that is $$KL(P\|Q) = \sum_w P(w) \cdot \log\frac{P(w)}{Q(w)}.$$

The formula (5) represents that L messages are found to ensure that relative entropy between a word distribution probability $U(E_c)$ of a word included in a message set formed by the L messages in the dictionary and the distribution probability of the subject content word $\phi_c^C$ is minimum.

In another embodiment of this application, several words may be directly extracted from $\phi_c^C$ to generate the message digest.

Figure 10:
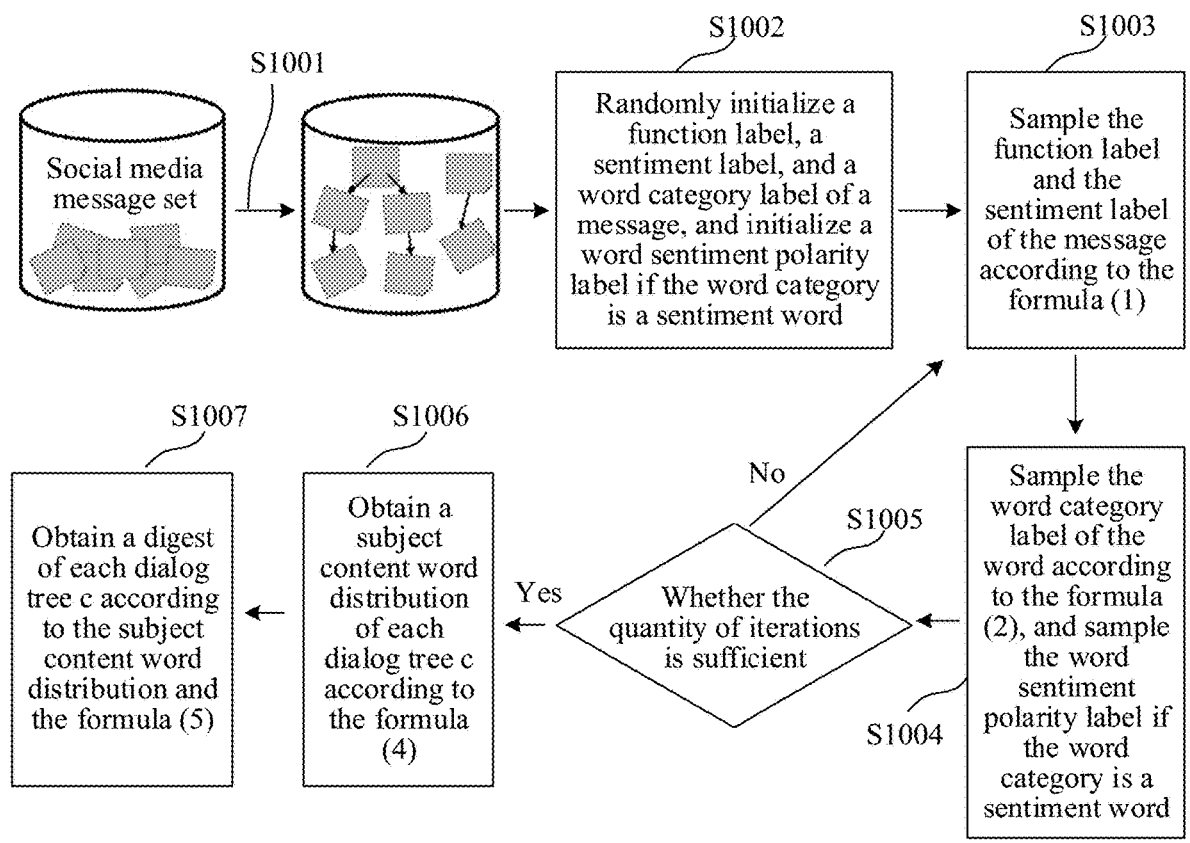
FIG. 10 is a schematic flowchart of processing a message in social media to generate a message digest according to an embodiment of this application.

A main flow of the foregoing four processes during implementation is shown in FIG. 10 and includes the following steps:

Step S1001: Organize an inputted social media message set into a dialog tree.

Step S1002: Randomly initialize a function label, a sentiment label, and a word category label of a message, the word category label of a word indicating whether the word is a function word, a subject content word, a sentiment word, or a background word, and initialize a word sentiment polarity label if the word category is a sentiment word.

Step S1003: Sample the function label and the sentiment label of the message according to the formula (1).

Step S1004: Sample the word category label of the word according to the formula (2), the word category label being used for indicating whether the word is a subject content word, a function word, a sentiment word, or a background word, and sample the word sentiment polarity label if the word category is a sentiment word.

Step S1005: Determine whether the quantity of times of iterative sampling is sufficient, that is, whether a set quantity of times is reached; and if the quantity of times of iterative sampling is sufficient, perform step S1006; otherwise, go back to step S1003.

Step S1006: Obtain a subject content word distribution $\phi_c^C$ of each dialog tree c according to the formula (4).

Step S1007: Obtain a digest of each dialog tree c according to the subject content word distribution $\phi_c^C$ and the formula (5).

In the embodiment shown in FIG. 10, descriptions are made using an example in which the function label and the sentiment label of the message are first sampled, and then the word category label and the word sentiment polarity label of the word are sampled. However, as described above, in another embodiment of this application, the word category label and the word sentiment polarity label of the word may be first sampled, and then the function label and the sentiment label of the message are sampled.

In addition, in the formula (1) in the foregoing embodiment, joint sampling is performed for the variables d and s of each message. In another embodiment of this application, the variables d and s of each message may be sequentially sampled, and a sampling sequence of the variables d and s is not limited. That is, the variable d of each message may be first sampled, and then the variable s of each message is sampled, or the variable s of each message may be first sampled, and then the variable d of each message is sampled. How to perform sequentially sample the variables d and s in this embodiment of this application is described below:

In an embodiment of this application, the variable d of each message may be sampled using the following formula (6):

$$p(d_{c,m} = d \mid d_{\neg(c,m)}, s, w, x, p, \theta) \propto \tag{6}$$

$$\frac{\Gamma\left(C_{d_c,pa(m),(\cdot)}^{DD} + D\cdot\gamma\right)}{\Gamma\left(C_{d_c,pa(m),(\cdot)}^{DD} + I(d_{c,pa(m)} \neq d) + D\cdot\gamma\right)} \cdot$$

$$\frac{\Gamma\left(C_{d_c,pa(m),(d)}^{DD} + I(d_{c,pa(m)} \neq d) + \gamma\right)}{\Gamma\left(C_{d_c,pa(m),d}^{DD} + D\cdot\gamma\right)} \cdot$$

$$\frac{\Gamma(C_{d,(\cdot)}^{DD} + D\cdot\gamma)}{\Gamma(C_{d,(\cdot)}^{DD} + I(d_{c,pa(m)} = d) + N_{(\cdot)}^{DD} + D\cdot\gamma)} \cdot$$

$$\prod_{d'=1}^{D} \frac{\Gamma(C_{d,(d')}^{DD} + I(d_{c,pa(m(} = d = d') + N_{(d')}^{DD} + \gamma)}{\Gamma(C_{d,(d')}^{DD} + \gamma)} \cdot$$

$$\frac{\Gamma(C_{d,(\cdot)}^{DW} + V\beta)}{\Gamma(C_{d,(\cdot)}^{DW} + N_{(\cdot)}^{DW} + V\beta)} \cdot \prod_{v=1}^{V} \frac{\Gamma(C_{d,(\cdot)}^{DW} + N_{(v)}^{DW} + \beta)}{\Gamma(C_{d,(\cdot)}^{DW} + \beta)} \cdot$$

$$\frac{\Gamma(C_{d,(\cdot)}^{DX} + 4\delta)}{\Gamma(C_{d,(\cdot)}^{DX} + N_{(\cdot)}^{DX} + 4\delta)} \cdot \prod_{x=0}^{3} \frac{\Gamma(C_{d,(x)}^{DX} + N_{(x)}^{DX} + \delta)}{\Gamma(C_{d,(x)}^{DX} + \delta)}$$

In the formula (6), $p(d_{c,m}=d|d_{\neg(c,m)},s,w,x,p,\theta)$ represents a probability that, on the basis that $d_{\neg(c,m)}$, s, w, x, p, and $\theta$ are predetermined, a function label of a message (c, m) is d. $d_{\neg(c,m)}$ represents a function label of another message other than the message (c, m); s represents a sentiment label of a message in the inputted message set; w represents all words in the inputted message set; x represents a word category (that is, whether a word is a subject content word, a function word, a sentiment word, or a background word); p represents a word sentiment polarity (that is, whether a word is positive or negative); and $\theta$ represents a set of all hyperparameters, including $\beta$, $\gamma$, $\delta$, $\omega$, and $\xi$. In the formula (6), the value of the function I( ) is 1 when the condition in "( )" is true; and the value of the function I( ) is 0 when the condition in "( )" is not true. For descriptions of other parameters in the formula (6), refer to the foregoing Table 1.

In an embodiment of this application, the variable s of each message may be sampled using the following formula (7):

$$p(s_{c,m} = s \mid d, s_{\neg(c,m)}, w, x, p, \theta) \propto \tag{7}$$

$$\frac{\Gamma(C_{s,(\cdot)}^{SP} + 2\omega)}{\Gamma(C_{s,(\cdot)}^{SP} + N_{(\cdot)}^{SP} + 2\omega)} \cdot \prod_{p \in \{POS, NEG\}} \frac{\Gamma(C_{s,(p)}^{SP} + N_{(p)}^{SP} + \omega)}{\Gamma(C_{s,(p)}^{SP} + \omega)}$$

In the formula (7), $p(s_{c,m}=s|d,s_{\neg(c,m)},w,x,p,\theta)$ represents a probability that, on the basis that d, $s_{\neg(c,m)}$, w, x, p, and $\theta$ are predetermined, a sentiment label of a message (c, m) is s. d represents a function label of a message in the inputted message set; $s_{\neg(c,m)}$ represents a sentiment label of another message other than the message (c, m); w represents all words in the inputted message set; x represents a word category (that is, whether a word is a subject content word, a function word, a sentiment word, or a background word); p represents a word sentiment polarity (that is, whether a word is positive or negative); and $\theta$ represents a set of all hyperparameters, including $\beta$, $\gamma$, $\delta$, $\omega$, and $\xi$. For descriptions of other parameters in the formula (7), refer to the foregoing Table 1.

Similarly, in the formula (2) in the foregoing embodiment, joint sampling is performed for the variables x and p of each message. In another embodiment of this application, the variables x and p of each message may be sequentially sampled, and a sampling sequence of the variables x and p is not limited. That is, the variable x of each message may be first sampled, and then the variable p of each message is sampled, or the variable p of each message may be first sampled, and then the variable x of each message is sampled.

In the technical solutions in the foregoing embodiments of this application, context information of the message on the social media is expanded using the replying and forwarding relationship, to relieve an adverse impact caused by data sparsity to extraction of a message subject. In addition, function information is jointly learned, and different probabilities that messages having different function labels include the subject content word are used, so that a probability of a non-subject word (such as a background word, a function word, and a sentiment word) in the subject content word distribution is reduced, to remove a word not related to the subject content and extract a message including more important content as a digest, thereby ensuring that the generated digest can include more important content.

In addition, in this application, a small quantity of sentiment dictionaries (including positive sentiment words and/or negative sentiment words) may be used for improving performance without depending on any manual annotation or additional large-scale data, and may be easily applied to any social media data set with replying and forwarding information, to output a high-quality digest.

In the technical solutions in the embodiments of this application, a most direct application is a supplement to a group chat background. For example, after a user is invited to join a chat group, the user may not keep pace in the group chat due to a lack of content of the previous group chat. After the technical solutions in the embodiments of this application are used, important information of the previous group chat may be automatically extracted, to give reference to a new user. Another important application scenario is a public opinion digest. For example, an actor releases a status in Moments to promote his new movie. The status may be replied and/or forwarded by a large quantity of followers and friends, and only a small quantity of the replied and/or forwarded messages are important viewpoints about the new movie. After the technical solutions in the embodiments of this application are used, important content may be extracted from the replied content, thereby helping the actor better understand public views about the movie.

In addition, in the technical solutions in the embodiments of this application, a core point in user discussion may further be automatically found, extracted, and organized, to facilitate important application scenarios such as public opinion analysis and focus tracking.

Apparatus embodiments of this application are described below, and may be used to perform the message digest generation method in the foregoing embodiments of this application. For details not disclosed in the apparatus embodiments of this application, refer to the embodiments of the foregoing message digest generation method of this application.

Figure 11:
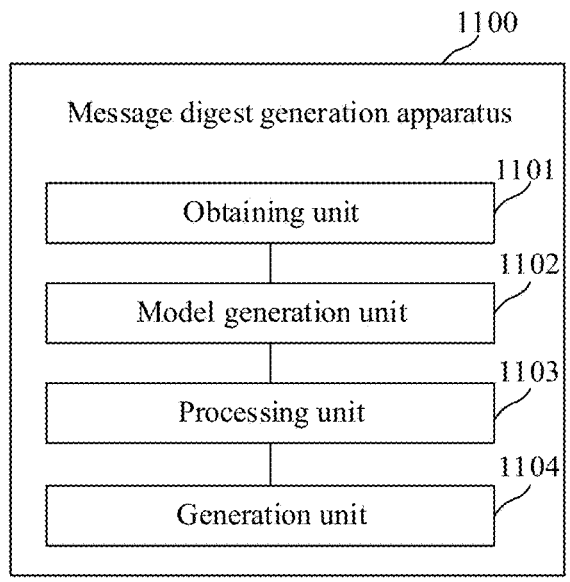
FIG. 11 is a schematic block diagram of a message digest generation apparatus according to an embodiment of this application.

FIG. 11 is a schematic block diagram of a message digest generation apparatus according to an embodiment of this application.

As shown in FIG. 11, the message digest generation apparatus 1100 according to an embodiment of this application includes an obtaining unit 1101, a model generation unit 1102, a processing unit 1103, and a generation unit 1104.

The obtaining unit 1101 is configured to obtain a plurality of messages having an association relationship from a to-be-processed message set; the model generation unit 1102 is configured to generate a function label distribution model, a sentiment label distribution model, a word category label distribution model, and a word sentiment polarity label distribution model corresponding to each of the plurality of messages, the word category label distribution model representing a probability that messages having different function labels include words of various categories, and the word sentiment polarity label distribution model representing a probability that messages having different sentiment labels include words of various sentiment polarities; the processing unit 1103 is configured to determine, based on the function label distribution model, the sentiment label distribution model, the word category label distribution model, and the word sentiment polarity label distribution model, a distribution probability that a category of a word included in the plurality of messages is a subject content word; and the generation unit 1104 is configured to generate a digest of the plurality of messages according to the distribution probability of the subject content word.

In an embodiment of this application, the model generation unit 1102 is configured to generate a D-dimensional polynomial distribution $\pi_d$, the D-dimensional polynomial distribution $\pi_d$ representing a probability distribution that, in a case that a function label of a parent node in a message tree formed by the plurality of messages is d, a function label of a child node of the parent node is among D function labels; and generate a polynomial distribution model of the function label corresponding to each message using the D-dimensional polynomial distribution $\pi_d$ as a parameter.

In an embodiment of this application, the model generation unit 1102 is configured to generate an S-dimensional polynomial distribution $\sigma_{d,s,s'}$, the S-dimensional polynomial distribution $\sigma_{d,s,s'}$ representing a probability distribution that a sentiment label of each message is s' in a case that a function label of each message is d and a sentiment label of a parent node in a message tree formed by the plurality of messages is s; and generate a polynomial distribution model of the sentiment label corresponding to each message using the S-dimensional polynomial distribution $\sigma_{d,s,s'}$ as a parameter.

In an embodiment of this application, the model generation unit 1102 is configured to generate an X-dimensional polynomial distribution $\tau_d$, the X-dimensional polynomial distribution $\tau_d$ representing a probability distribution that a message with a function label d includes words of various categories, the words of various categories including a subject content word, a sentiment word, and a function word, or including a subject content word, a sentiment word, a function word, and a background word; and generate a polynomial distribution model of a word category label corresponding to each word in each message using the X-dimensional polynomial distribution $\tau_d$ as a parameter.

In an embodiment of this application, the model generation unit 1102 is configured to generate a two-dimensional polynomial distribution $\rho_s$, the two-dimensional polynomial distribution $\rho_s$ representing a probability distribution that a message with a sentiment label s includes a positive sentiment word and a negative sentiment word; and generate a polynomial distribution model of a word sentiment polarity label corresponding to each word in each message using the two-dimensional polynomial distribution $\rho_s$ as a parameter.

In an embodiment of this application, the message digest generation apparatus 1100 further includes a setting unit, configured to set, in a case that the plurality of messages include a target word matching a positive sentiment word and/or a negative sentiment word included in a preset sentiment dictionary, a word sentiment polarity label of the target word according to a sentiment polarity of the matched word.

In an embodiment of this application, the processing unit 1103 is configured to perform iterative sampling on the function label distribution model, the sentiment label distribution model, the word category label distribution model, and the word sentiment polarity label distribution model, to obtain the distribution probability that the category of the word included in the plurality of messages is a subject content word.

In an embodiment of this application, the processing unit 1103 is configured to perform iterative sampling on the function label distribution model, the sentiment label distribution model, the word category label distribution model, and the word sentiment polarity label distribution model based on a Gibbs sampling algorithm.

In an embodiment of this application, the processing unit 1103 includes: an initialization unit, configured to randomly initialize a function label and a sentiment label of each message, and the word category label of each word in each message, and initialize a word sentiment polarity label of each word whose word category label is a sentiment word; and a sampling unit, configured to perform, during one iteration, sampling of the function label and the sentiment label on each message based on the function label distribution model and the sentiment label distribution model, and perform sampling of the word category label and the word sentiment polarity label on each word in each message based on the word category label distribution model and the word sentiment polarity label distribution model.

In an embodiment of this application, the sampling unit is configured to perform, on the basis that the word category label and the word sentiment polarity label of each of the plurality of messages, and the function label and the sentiment label of another of the plurality of messages are predetermined, joint sampling of the function label and the sentiment label on each message based on the function label distribution model and the sentiment label distribution model.

In an embodiment of this application, the sampling unit is configured to perform, on the basis that the sentiment label, the word category label, and the word sentiment polarity label of each of the plurality of messages, and the function label of another of the plurality of messages are predetermined, sampling of the function label on each message based on the function label distribution model; and perform, on the basis that the function label, the word category label, and the word sentiment polarity label of each of the plurality of messages, and the sentiment label of another of the plurality of messages are predetermined, sampling of the sentiment label on each message based on the sentiment label distribution model.

In an embodiment of this application, the sampling unit is configured to perform, on the basis that the function label and the sentiment label of each of the plurality of messages, and the word category label and the word sentiment polarity label of another of the plurality of messages are predetermined, sampling of the word category label and the word sentiment polarity label on each word in each message based on the word category label distribution model and the word sentiment polarity label distribution model.

In an embodiment of this application, the sampling unit is configured to perform, on the basis that the word category label, the function label, and the sentiment label of each of the plurality of messages, and the word sentiment polarity label of another of the plurality of messages are predetermined, sampling of the word sentiment polarity label on each word in each message based on the word sentiment polarity label distribution model; and perform, on the basis that the word sentiment polarity label, the function label, and the sentiment label of each of the plurality of messages, and the word category label of another of the plurality of messages are predetermined, sampling of the word category label on each word in each message based on the word category label distribution model.

In an embodiment of this application, the generation unit 1104 is configured to select a predetermined quantity of target messages from the plurality of messages, relative entropy between a word distribution probability of a word included in a message set formed by the predetermined quantity of target messages in a dictionary and the distribution probability of the subject content word being minimum, the dictionary being formed by all words included in the to-be-processed message set; and generate the digest of the plurality of messages according to the predetermined quantity of target messages.

In an embodiment of this application, the generation unit 1104 is configured to select a predetermined quantity of subject content words based on the distribution probability of the subject content word to generate the digest of the plurality of messages.

In an embodiment of this application, the obtaining unit 1101 is configured to obtain, according to a replying and/or forwarding relationship between the messages, a plurality of messages having the replying and/or forwarding relationship from the message set.

In an embodiment of this application, the message digest generation apparatus 1100 further includes a message tree generation unit, configured to generate a message tree corresponding to the plurality of messages based on the replying and/or forwarding relationship between the plurality of messages.

In the technical solutions provided in the embodiments of this application, a plurality of messages having an association relationship are obtained from a to-be-processed message set, and a message subject is then determined based on the plurality of messages, so that context information of the message can be expanded based on the association relationship between the messages, thereby resolving the problem that a determined subject is inaccurate due to a relatively small quantity of messages. In addition, a function label distribution model, a sentiment label distribution model, a word category label distribution model, and a word sentiment polarity label distribution model corresponding to each message are generated, so that when a distribution probability of a subject content word is determined, a probability that messages having different function labels include the subject content word can be considered, and a word category label and a word sentiment polarity label can be determined to reduce a distribution probability of a non-subject content word (such as a background word, a function word, and a sentiment word) in a subject content word distribution, thereby ensuring that a more accurate message digest can be obtained, ensuring that the message digest can includes more important content, and improving the quality of the determined message digest.

Although several modules or units of the device for action execution are mentioned in the foregoing detailed descriptions, the division is not mandatory. In fact, according to the implementations of this application, features and functions of two or more modules or units described above may be specifically implemented in one module or unit. Conversely, features and functions of one module or unit described above may be further divided for a plurality of modules or units to specifically implement.

Through the foregoing descriptions of the implementations, a person skilled in the art may easily understand that the exemplary implementations described herein may be implemented using software, or may be implemented using software in combination with necessary hardware. Therefore, the technical solutions according to the implementations of this application may be implemented in a form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the implementations of this application.

After considering the specification and practicing this application disclosed herein, a person skilled in the art would easily conceive of another implementation solution of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application. The scope of this application is limited only by the appended claims.

What is claimed is:

1. A method for generating digest for message, comprising:
    obtaining a plurality of associated messages from a to-be-processed message set;
    generating a function label distribution model, a sentiment label distribution model, a word category label distribution model, and a word sentiment polarity label distribution model corresponding to each of the plurality of associated messages, the word category label distribution model representing a probability that messages having different function labels comprise words with respective categories, and the word sentiment polarity label distribution model representing a probability that messages having different sentiment labels comprise words with respective sentiment polarities;
    determining, based on the function label distribution model, the sentiment label distribution model, the word category label distribution model, and the word sentiment polarity label distribution model, a distribution probability that a category of a word in the plurality of associated messages is a subject content word; and
    generating a digest of the plurality of associated messages according to the distribution probability of the subject content word.

2. The method of claim 1, wherein generating the function label distribution model corresponding to each of the plurality of associated messages comprises:
    generating a D-dimensional polynomial distribution $\pi_d$, the D-dimensional polynomial distribution $\pi_d$ representing a probability distribution that, in response to a function label of a parent node in a message tree formed by the plurality of associated messages is d, a function label of a child node of the parent node is among D function labels; and
    generating a polynomial distribution model of the function label corresponding to each message using the D-dimensional polynomial distribution $\pi_d$ as a parameter.

3. The method of claim 1, wherein generating the sentiment label distribution model corresponding to each of the plurality of associated messages comprises:
    generating a S-dimensional polynomial distribution $\sigma_{d,s,s'}$, the S-dimensional polynomial distribution $\sigma_{d,s,s'}$ representing a probability distribution that a sentiment label of a message is s' in response to a function label of the message being d and a sentiment label of a parent node of the message in a message tree formed by the plurality of associated messages being s; and
    generating a polynomial distribution model of the sentiment label corresponding to each message using the S-dimensional polynomial distribution $\sigma_{d,s,s'}$ as a parameter.

4. The method of claim 1, wherein generating the word category label distribution model corresponding to each of the plurality of associated messages comprises:
    generating an X-dimensional polynomial distribution $\tau_d$, the X-dimensional polynomial distribution $\tau_d$ representing a probability distribution that a message with a function label d comprises words with respective categories, the words with respective categories comprising at least one of a subject content word, a sentiment word, and a function word, or a background word; and
    generating a polynomial distribution model of a word category label corresponding to each word in each message using the X-dimensional polynomial distribution $\tau_d$ as a parameter.

5. The method of claim 1, wherein generating the word sentiment polarity label distribution model corresponding to each of the plurality of associated messages comprises:
    generating a two-dimensional polynomial distribution $\rho_s$, the two-dimensional polynomial distribution $\rho_s$ representing a probability distribution that a message with a sentiment label s comprises a positive sentiment word and a negative sentiment word; and
    generating a polynomial distribution model of a word sentiment polarity label corresponding to each word in each message using the two-dimensional polynomial distribution $\rho_s$ as a parameter.

6. The method of claim 5, further comprising:
in response to the plurality of associated messages comprising a target word matching a positive sentiment word or a negative sentiment word in a preset sentiment dictionary, setting a word sentiment polarity label of the target word according to a sentiment polarity of the positive sentiment word or the negative sentiment word.

7. The method of claim 1, wherein determining the distribution probability that the category of the word in the plurality of associated messages is a subject content word comprises:
performing iterative sampling on the function label distribution model, the sentiment label distribution model, the word category label distribution model, and the word sentiment polarity label distribution model, to obtain the distribution probability that the category of the word in the plurality of associated messages is a subject content word.

8. The method of claim 7, wherein performing iterative sampling on the function label distribution model, the sentiment label distribution model, the word category label distribution model, and the word sentiment polarity label distribution model comprises:
performing iterative sampling on the function label distribution model, the sentiment label distribution model, the word category label distribution model, and the word sentiment polarity label distribution model based on a Gibbs sampling algorithm.

9. The method of claim 8, wherein performing iterative sampling on the function label distribution model, the sentiment label distribution model, the word category label distribution model, and the word sentiment polarity label distribution model based on the Gibbs sampling algorithm comprises:
randomly initializing a function label and a sentiment label of each message, and a word category label of each word in each message;
initializing a word sentiment polarity label of each word whose word category label is a sentiment word; and
performing, during an iteration, sampling of a function label and a sentiment label on each message based on the function label distribution model and the sentiment label distribution model, and sampling of a word category label and a word sentiment polarity label on each word in each message based on the word category label distribution model and the word sentiment polarity label distribution model.

10. The method of claim 9, wherein performing sampling of the function label and the sentiment label on each message based on the function label distribution model and the sentiment label distribution model comprises:
in response to a word category label and a word sentiment polarity label of a message in the plurality of associated messages, and a function label and a sentiment label of another message in the plurality of associated messages being predetermined, performing joint sampling of a function label and a sentiment label on the message based on the function label distribution model and the sentiment label distribution model.

11. The method of claim 9, wherein performing sampling of the function label and the sentiment label on each message based on the function label distribution model and the sentiment label distribution model comprises:
in response to a sentiment label, a word category label, and a word sentiment polarity label of a message in the plurality of associated messages, and a function label of another message in the plurality of associated messages being predetermined, performing sampling of a function label on the message based on the function label distribution model; and
in response to a function label, a word category label, and a word sentiment polarity label of a message in the plurality of associated messages, and a sentiment label of another of the plurality of associated messages are predetermined, performing sampling of a sentiment label on the message based on the sentiment label distribution model.

12. The method of claim 9, wherein performing sampling of the word category label and the word sentiment polarity label on each word in each message based on the word category label distribution model and the word sentiment polarity label distribution model comprises:
in response to a function label and a sentiment label of a message in the plurality of associated messages, and a word category label and a word sentiment polarity label of another message in the plurality of associated messages being predetermined, performing sampling of the word category label and the word sentiment polarity label on each word in the message based on the word category label distribution model and the word sentiment polarity label distribution model.

13. The method of claim 9, wherein performing sampling of the word category label and the word sentiment polarity label on each word in each message based on the word category label distribution model and the word sentiment polarity label distribution model comprises:
in response to a word category label, a function label, and a sentiment label of a message in the plurality of associated messages, and a word sentiment polarity label of another message in the plurality of associated messages being predetermined, performing sampling of a word sentiment polarity label on each word in the message based on the word sentiment polarity label distribution model; and
in response to a word sentiment polarity label, a function label, and a sentiment label of a message in the plurality of associated messages, and a word category label of another message in the plurality of associated messages being predetermined, performing sampling of a word category label on each word in the message based on the word category label distribution model.

14. The method of claim 1, wherein generating a digest of the plurality of associated messages according to the distribution probability of the subject content word comprises:
selecting a predetermined quantity of target messages from the plurality of associated messages, the predetermined quantity of target messages forming a message set, a word distribution probability of a word in the message set in a dictionary and the distribution probability of the subject content word having a minimum relative entropy, the dictionary being formed by all words in the to-be-processed message set; and
generating the digest of the plurality of associated messages according to the predetermined quantity of target messages.

15. An apparatus for generating digest for message, comprising:
a memory operable to store program code; and
a processor operable to read the program code and configured to:
obtain a plurality of associated messages from a to-be-processed message set;

generate a function label distribution model, a sentiment label distribution model, a word category label distribution model, and a word sentiment polarity label distribution model corresponding to each of the plurality of associated messages, the word category label distribution model representing a probability that messages having different function labels comprise words with respective categories, and the word sentiment polarity label distribution model representing a probability that messages having different sentiment labels comprise words with respective sentiment polarities;

determine, based on the function label distribution model, the sentiment label distribution model, the word category label distribution model, and the word sentiment polarity label distribution model, a distribution probability that a category of a word in the plurality of associated messages is a subject content word; and generate a digest of the plurality of associated messages according to the distribution probability of the subject content word.

16. The apparatus of claim 15, wherein the processor is configured to:

generate a D-dimensional polynomial distribution $\pi_d$, the D-dimensional polynomial distribution $\pi_d$ representing a probability distribution that, in response to a function label of a parent node in a message tree formed by the plurality of associated messages is d, a function label of a child node of the parent node is among D function labels; and generate a polynomial distribution model of the function label corresponding to each message using the D-dimensional polynomial distribution $\pi_d$ as a parameter.

17. The apparatus of claim 15, wherein the processor is configured to:

generate a S-dimensional polynomial distribution $\sigma_{d,s,s'}$, the S-dimensional polynomial distribution $\sigma_{d,s,s'}$ representing a probability distribution that a sentiment label of a message is s' in response to a function label of the message being d and a sentiment label of a parent node of the message in a message tree formed by the plurality of associated messages being s; and generate a polynomial distribution model of the sentiment label corresponding to each message using the S-dimensional polynomial distribution $\sigma_{d,s,s'}$ as a parameter.

18. The apparatus of claim 15, wherein the processor is configured to:

generate an X-dimensional polynomial distribution $\tau_d$, the X-dimensional polynomial distribution $\tau_d$ representing a probability distribution that a message with a function label d comprises words with respective categories, the words with respective categories comprising at least one of a subject content word, a sentiment word, and a function word, or a background word; and generate a polynomial distribution model of a word category label corresponding to each word in each message using the X-dimensional polynomial distribution $\tau_d$ as a parameter.

19. The apparatus of claim 15, wherein the processor is configured to:

generate a two-dimensional polynomial distribution $\rho_s$, the two-dimensional polynomial distribution $\rho_s$ representing a probability distribution that a message with a sentiment label s comprises a positive sentiment word and a negative sentiment word; and generate a polynomial distribution model of a word sentiment polarity label corresponding to each word in each message using the two-dimensional polynomial distribution $\rho_s$ as a parameter.

20. A non-transitory machine-readable media, having processor executable instructions stored thereon for causing a processor to:

obtain a plurality of associated messages from a to-be-processed message set;

generate a function label distribution model, a sentiment label distribution model, a word category label distribution model, and a word sentiment polarity label distribution model corresponding to each of the plurality of associated messages, the word category label distribution model representing a probability that messages having different function labels comprise words with respective categories, and the word sentiment polarity label distribution model representing a probability that messages having different sentiment labels comprise words with respective sentiment polarities;

determine, based on the function label distribution model, the sentiment label distribution model, the word category label distribution model, and the word sentiment polarity label distribution model, a distribution probability that a category of a word in the plurality of associated messages is a subject content word; and generate a digest of the plurality of associated messages according to the distribution probability of the subject content word.

\* \* \* \* \*